United States Patent
Mahinpey et al.

(10) Patent No.: US 11,628,426 B2
(45) Date of Patent: Apr. 18, 2023

(54) CATALYST FOR CHEMICAL LOOPING COMBUSTION

(71) Applicant: UTI Limited Partnership, Calgary (CA)

(72) Inventors: Nader Mahinpey, Calgary (CA); Amr Abdalla Ibrahim Abdalla, Calgary (CA); Mansour Mohammedramadan Tijani, Calgary (CA)

(73) Assignee: UTI LIMITED PARTNERSHIP, Calgary (CA)

(*) Notice: Subject to any disclaimer, the term of this patent is extended or adjusted under 35 U.S.C. 154(b) by 15 days.

(21) Appl. No.: 17/237,545

(22) Filed: Apr. 22, 2021

(65) Prior Publication Data
US 2021/0339231 A1 Nov. 4, 2021

Related U.S. Application Data
(60) Provisional application No. 63/017,352, filed on Apr. 29, 2020.

(51) Int. Cl.
| | |
|---|---|
| B01J 21/06 | (2006.01) |
| B01J 23/888 | (2006.01) |
| B01J 35/10 | (2006.01) |
| B01J 37/02 | (2006.01) |
| B01J 37/03 | (2006.01) |
| B01J 37/08 | (2006.01) |
| B01J 37/00 | (2006.01) |

(52) U.S. Cl.
CPC .......... *B01J 23/888* (2013.01); *B01J 21/066* (2013.01); *B01J 35/1009* (2013.01); *B01J 35/1014* (2013.01); *B01J 35/1038* (2013.01); *B01J 35/1061* (2013.01); *B01J 37/0036* (2013.01); *B01J 37/0209* (2013.01); *B01J 37/035* (2013.01); *B01J 37/082* (2013.01)

(58) Field of Classification Search
CPC ............................ B01J 21/066; B01J 23/888
See application file for complete search history.

(56) References Cited

U.S. PATENT DOCUMENTS

| | | | | |
|---|---|---|---|---|
| 2006/0245999 | A1* | 11/2006 | Shen | C01G 25/02 423/608 |
| 2010/0092898 | A1* | 4/2010 | Dahl | B01J 8/0257 431/170 |
| 2012/0261311 | A1* | 10/2012 | Bellussi | B01J 35/1019 208/143 |

(Continued)

FOREIGN PATENT DOCUMENTS

| | | |
|---|---|---|
| CN | 106902837 | 6/2017 |
| CN | 106902837 A * | 6/2017 |

OTHER PUBLICATIONS

Machine translatin of CN-106902837-A, publication date Jun. 2017.*

(Continued)

*Primary Examiner* — Jun Li
(74) *Attorney, Agent, or Firm* — Nguyen Tarbet LLC

(57) ABSTRACT

A catalyst for use in chemical looping combustion is provided. The catalyst includes a mixture of metal oxides dispersed on a ceramic support. The mixture of metal oxides forms a nickel tungsten oxide ($NiWO_4$) interaction complex which functions as an oxygen carrier in the chemical looping combustion reaction.

18 Claims, 19 Drawing Sheets

(56) References Cited

U.S. PATENT DOCUMENTS

2017/0210622 A1\* 7/2017 Nestl .................. C01B 3/063
2020/0087576 A1\* 3/2020 Marker ................ C01B 3/40

OTHER PUBLICATIONS

Sheng et al. (Effects of tungsten on the catalytic activity of Ni—W catalysts for the hydrogenation of aromatic hydrocarbons, Reaction Kinetics, Mechanisms and Catalysis vol. 99, pp. 371-379 (2010)).\*
Fan, L-S et al. Energy Environ. Sci., 2012, 5, 7254-7280.
Fang, H et al. Int. J. Chem. Eng., 2009 Article ID 710515, 1-16, doi:10.1155/2009/710515.
Kodama, T. et al., Energy 2000, 25, 411-425.
Charisiou, N. D. et al., Front. Envir. Sci. 2017, 5, Article 66, 1-13, doi.org/10.3389/fenvs.2017.00066.
Chen, S. et a., ACS Catal., 2017, 5, 3548-3559.
Southmayd D. W. et al., J. Chem. Soc. Faraday Trans. 1993, 89, 2075-2083.
Sohn, J. R. & Lee, S. Y. Appl. Catal. A: General, 1997, 164, 127-140.
Torres, G. C. et al., Quim. Nova, 2012, 35, 748-754.
Cho, P. et al., Ind. Eng. Chem. Res. 2005, 44, 668-676.
Shimizu, T. et al., Solar Energy 2001, 71, 315-324.
Kodama T. et al., Energy, 2003, 28, 1055-1068.
Kwak, J. H. Int. J. Hydrogen Energy, 2013, 38, 8293-8305.
Quddus, M. R. A Novel Mixed Metallic Oxygen Carrier for Chemical Looping Combustion: Preparation, Characterization and Kinetic Modeling (Thesis), 2013, University of Western Ontario.
Tijani, M. M et al., Energy, 2017, 138, 873-882.

\* cited by examiner

CATALYST FOR CHEMICAL LOOPING COMBUSTION

CROSS-REFERENCE TO RELATED APPLICATIONS

This application claims priority from U.S. Provisional Application Ser. No. 63/017,352, filed on Apr. 29, 2020, the entire disclosure of which is incorporated herein by reference.

FIELD

The technology described herein relates to industrial processes for generating products from basic petroleum products and more specifically to oxygen carrying catalysts for chemical looping combustion which is used for power generation and synthesis of hydrogen and industrial chemicals.

BACKGROUND

Chemical looping combustion (CLC) is a process used to capture $CO_2$ and to convert carbonaceous fuel into various products including power, hydrogen, and industrial chemicals. A typical CLC system consists of two reactors; a fuel reactor and an air reactor. In the fuel reactor, the metal oxide is reduced, and the fuel is completely converted into $CO_2$ and steam. While in the air reactor, the reduced metal oxides are oxidized using air which also produces heat that can be utilized for power generation. The two separate reactors are used to avoid contact of the fuel with other air constituents, which in turns leads to production of a highly concentrated $CO_2$ stream.[1]

Oxygen carrier catalysts based on individual metal oxides used for chemical looping combustion have various advantages and disadvantages. Hence, the use of oxygen carriers based on mixed metal oxides has been suggested to combine the advantages of individual metal oxides together with partial mitigation of the disadvantages.[2]

Investigations of CLC catalysts have been reported over the past two decades.

In one investigation, $WO_3/W$ was used for methane conversion and the reactivities of the tungsten metals/oxides were found to be enhanced with the use of the support. Silica, alumina and zirconia supports were tested and it was found that the zirconia-supported catalyst provided excellent performance in terms of product yield when compared to unsupported $WO_3$, silica and alumina supported by $WO_3$.[3]

In another study, the effect of $WO_3$ modification of $ZrO_2$ on Ni-catalyzed dry reforming of biogas was investigated with 8% (w/w) Ni catalyst. Although Ni dispersion and reducibility characteristics were superior for the $WO_3$-modified catalyst relative to non-modified $ZrO_2$, its catalytic performance was inferior as a result of enhanced acidity.[4]

A dual catalyst for chemical looping partial oxidation of methane was tested with $WO_3$-based catalyst modified with Ni over an alumina support.[5,6]

Nickel mixed with $WO_3/Al_2O_3$ has been designed and proposed to be used for HDS (Hydrodesulfurization).[7]

Nickel oxide over zirconia prepared by co-precipitation and further modified by tungsten oxide ($WO_3$) has been investigated in dimerization of ethylene. The addition of $WO_3$ to $NiO/ZrO_2$ resulted in enhancement of reactivity even at room temperature.[8]

In another investigation, $WO_3/ZrO_2$ was prepared via incipient wetness impregnation and further modified by the addition of Ni with maximum Ni loading of 5%. The resultant catalysts were tested for n-butane isomerization, cyclohexane dehydrogenation and n-octane hydroisomerization-cracking. The Ni addition led to increases in total acidity and concentration of strong acid sites, providing enhancement of dehydrogenation and cracking reactions.[9]

There continues to be a need for improved catalysts for use in CLC.

SUMMARY

According to one embodiment, there is provided a catalyst for use in chemical looping combustion. The catalyst comprises a mixture of metal oxides dispersed on a ceramic support, the mixture of metal oxides forming a nickel tungsten oxide ($NiWO_4$) interaction complex which functions as an oxygen carrier in the chemical looping combustion reaction.

In some embodiments of the catalyst, the ceramic support is calcium aluminate of formula $CaAl_2O_4$, silica of formula $SiO_2$, titanium dioxide of formula $TiO_2$, perovskite of formula $CaTiO_3$, alumina of formula $Al_2O_3$, yttrium dioxide of formula $Y_2O_3$, barium zirconate of formula $BaZrO_3$, magnesium aluminate of formula $MgAl_2O_4$, magnesium silicate of formula $MgSi_2O_4$, lanthanum oxide of formula $La_2O_3$ or zirconia of formula $ZrO_2$.

In some embodiments of the catalyst, the ceramic support is zirconia of formula $ZrO_2$.

In some embodiments of the catalyst, the zirconia is calcined at a temperature at or above about 900° C. for at least about 4 hours.

In some embodiments of the catalyst, the mixture of metal oxides includes nickel oxide of formula NiO and tungsten oxide of formula $WO_3$.

In some embodiments, the catalyst comprises between about 25% to about 60% NiO (w/w), between about 10% to about 35% $WO_3$ (w/w) and between about 5% to about 65% $ZrO_2$ (w/w).

In some embodiments, the catalyst has an oxygen carrying capacity of about 4.2% (w/w) to about 15.6% (w/w).

In some embodiments, the catalyst has a Brunauer-Emmett-Teller (BET) surface area between about 4.1 $m^2/g$ to about 16.7 $m^2/g$.

In some embodiments, the catalyst has a pore volume of about 0.030 $cm^3/g$ to about 0.094 $cm^3/g$.

In some embodiments, the catalyst has an adsorption average pore width (4V/A by BET) between about 225 Å to about 300 Å.

According to another embodiment, there is provided a process for synthesizing an oxygen carrier catalyst. The process includes the steps of mixing nickel (II) nitrate hexahydrate ($N_2NiO_6.6H_2O$) with ammonium metatungstate and a ceramic support in water and evaporating the water.

In some embodiments of the process, the ceramic support is calcium aluminate of formula $CaAl_2O_4$, silica of formula $SiO_2$, titanium dioxide of formula $TiO_2$, perovskite of formula $CaTiO_3$, alumina of formula $Al_2O_3$, yttrium dioxide of formula $Y_2O_3$, barium zirconate of formula $BaZrO_3$, magnesium aluminate of formula $MgAl_2O_4$, magnesium silicate of formula $MgSi_2O_4$, lanthanum oxide of formula $La_2O_3$ or zirconia of formula $ZrO_2$.

In some embodiments of the process, the ceramic support is zirconia of formula $ZrO_2$.

In some embodiments of the process, the zirconia is calcined at a temperature at or above about 900° C. for at least about 4 hours.

In some embodiments of the process, the synthesized catalyst includes nickel oxide of formula NiO and tungsten oxide of formula $WO_3$.

In some embodiments of the process, the synthesized catalyst includes between about 25% to about 60% NiO (w/w), between about 10% to about 35% $WO_3$ (w/w) and between about 5% to about 65% $ZrO_2$ (w/w).

In some embodiments of the process, the synthesized catalyst has an oxygen carrying capacity of about 4.2% (w/w) to about 15.6% (w/w).

In some embodiments of the process, the synthesized catalyst has a Brunauer-Emmett-Teller (BET) surface area between about 4.1 $m^2/g$ to about 16.7 $m^2/g$.

In some embodiments of the process, the synthesized catalyst has a pore volume of about 0.030 $cm^3/g$ to about 0.094 $cm^3/g$.

In some embodiments of the process, the synthesized catalyst has an adsorption average pore width (4V/A by BET) between about 225 Å to about 300 Å.

BRIEF DESCRIPTION OF THE DRAWINGS

Various objects, features and advantages of embodiments of the subject technology will be apparent from the following description.

DETAILED DESCRIPTION

Rationale

Figure 1:
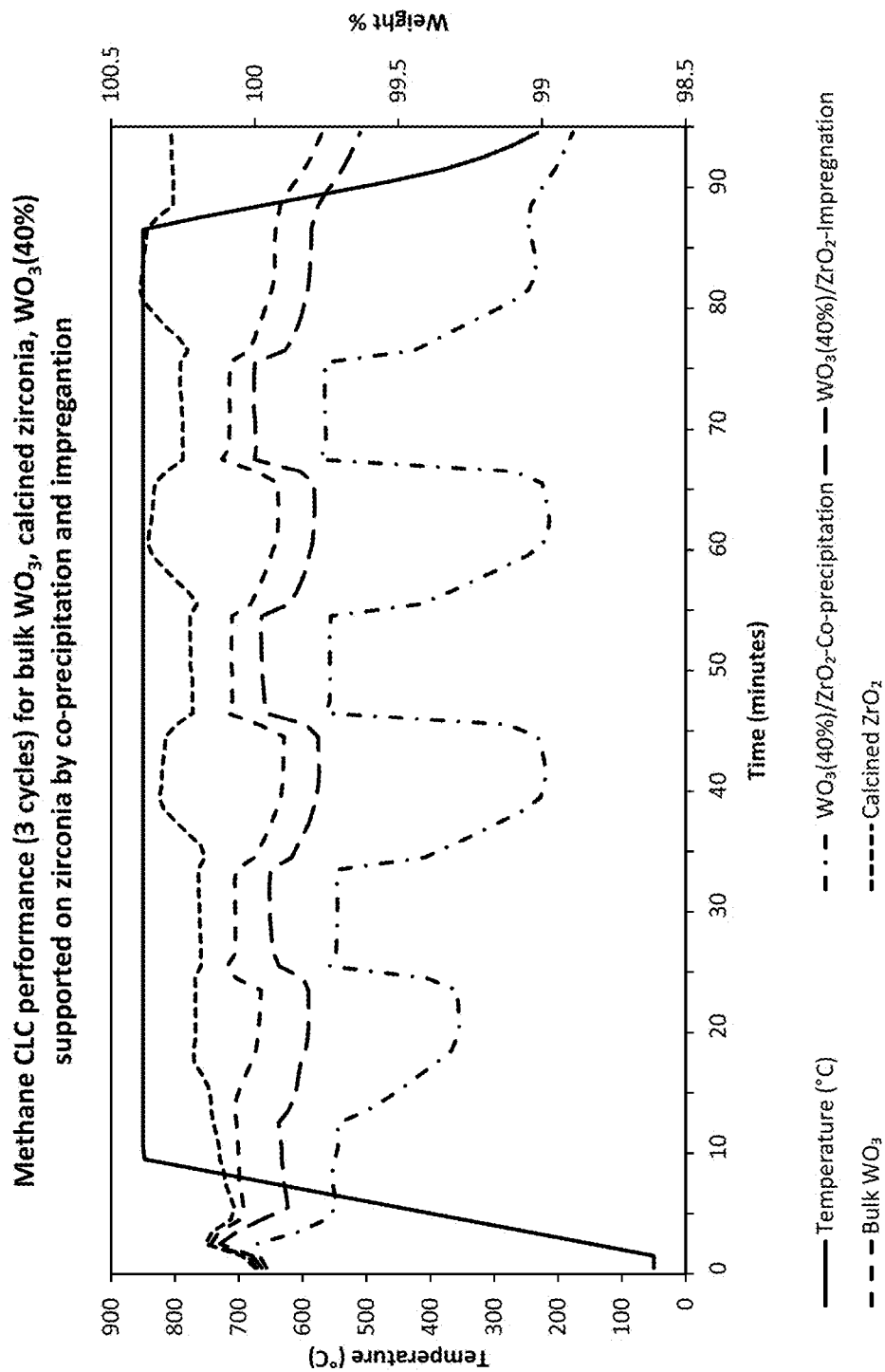
FIG. 1 is a plot of methane CLC performance (3 cycles) for bulk $WO_3$, calcined zirconia, and $WO_3$(40%) supported on zirconia generated by co-precipitation and by impregnation.

Carbon (coke) formation associated with Ni-based oxygen carriers results in transportation of carbon to the air reactor with the oxygen carriers. Then the carbon is converted to $CO_2$ in the air reactor, resulting in degradation of $CO_2$ separation efficacy. If methane is used as a fuel in CLC, carbon can be formed through methane decomposition (equation 1) or the Boudouard reaction (equation 2).[10]

$$CH_4 \rightarrow C + 2H_2 \qquad (eq\ 1)$$

$$2CO \rightarrow +C + CO_2 \qquad (eq\ 2)$$

The inventors recognized that further investigation of $WO_3$-modified supports such as $ZrO_2$ further modified with oxides of nickel would be a worthwhile endeavor which could lead to improvements in catalytic reactivity with enhanced oxygen carrying capacity and mitigation of formation of carbon (coke) on the surface of the catalyst.

INTRODUCTION

Experiments leading to identification of useful catalyst compositions for CLC will now be described hereinbelow with reference to data shown in tables and figures. A number of possible alternative features are introduced during the course of this description. It is to be understood that, according to the knowledge and judgment of persons skilled in the art, such alternative features may be substituted in various combinations to arrive at different embodiments.

A novel nickel-based oxygen carrier catalyst for chemical looping combustion (CLC) is described. Zirconia ($ZrO_2$) was selected as the support due to its stable performance and high melting point (2715° C.). However, it is to be understood that other ceramic supports may be used instead of zirconia. Such alternative ceramic supports include but are not limited to calcium aluminate of formula $CaAl_2O_4$, silica of formula $SiO_2$, titanium dioxide of formula $TiO_2$, perovskite of formula $CaTiO_3$, alumina of formula $Al_2O_3$, yttrium dioxide of formula $Y_2O_3$, barium zirconate of formula $BaZrO_3$, magnesium aluminate of formula $MgAl_2O_4$, magnesium silicate of formula $MgSi_2O_4$ and lanthanum oxide of formula $La_2O_3$. Tungsten oxide is used as a promoter to facilitate the formation of a stable $NiWO_4$ interaction complex. The synthesized oxygen carrier catalyst is intended to be used in CLC to enhance the reactivity and mitigate the formation of carbon on the catalyst surface. The catalysts described herein have excellent performance relative to the individual metal oxides. Methods of synthesizing the catalyst and evaluating the catalyst for the CLC process are also described.

Materials and Methods

Metal Precursors—Tungstic acid ($H_2WO_4$ powder) was used as a source of bulk $WO_3$. Nickel (II) nitrate hexahydrate ($N_2NiO_6 \cdot 6H_2O$) was used as a source of nickel for the impregnation and co-precipitation methods used to prepare the oxygen carrier catalysts. Ammonium metatungstate (($NH_4$)$_6$($H_2W_{12}O_{40}$)) was used as a source of tungsten for the impregnation method. Tungsten (VI) chloride ($WCl_6$)

was used as a source of tungsten for the co-precipitation method. For the support, zirconium (IV) oxynitrate hydrate ($N_2O_7Zr.xH_2O$) was used as a support precursor for the co-precipitation method, and commercial zirconia (zirconium (IV) oxide ($ZrO_2$)), was used for the impregnation method. All chemicals were purchased from Sigma Aldrich, Canada, except for the commercial zirconia support, which was purchased from Alfa Aesar. All compounds were used without modifications unless otherwise specified hereinbelow.

Bulk tungsten trioxide ($WO_3$) was prepared by thermal decomposition of tungstic acid ($H_2WO_4$) in powder form at 800° C. for 4 hours as previously described.[5,6]

The $WO_3/ZrO_2$ used in this investigation was prepared as previously described.[3, 11-13]

In one preparation method, the $WO_3$—NiO over zirconia catalyst was prepared by co-precipitation as previously described[5,6] with modification of the calcination temperature to 900° C. to provide enhanced stability of the catalyst.

In another preparation method, the $WO_3$—NiO over zirconia catalyst was prepared using the impregnation method as previously described[11] with incorporation of the nickel precursor initially derived from the $Ni(NO_3)_3.6H_2O$, with modification of the calcination temperature to 900° C.

Bulk $WO_3$ was prepared by thermal decomposition and the mono and dual catalysts were prepared using co-precipitation and impregnation methods. Dual and mono catalysts were prepared using the co-precipitation method and the specific catalyst composition was determined.

For the preparation of $WO_3/ZrO_2$ using the co-precipitation method, ethanol was used to dissolve tungsten (VI) chloride ($WCl_6$) and zirconium (IV) oxynitrate hydrate ($N_2O_7Zr.xH_2O$) (since water cannot be used for the dissolution of $WCl_6$). Sodium hydroxide (NaOH) was then added to the mixture to raise the pH to range between 8-9, as verified using a pH meter. The addition of the base (NaOH) resulted in the formation of precipitates of the supported oxygen carriers. After 2 hours of continuous mixing, the solution was filtered using filter paper, and washed with distilled water to remove sodium and chloride compounds from the sample. Then the sample was dried at 80° C. for 1 day, followed by sample grinding and calcination at 900° C. for 4 hours.

For NiO—$WO_3/ZrO_2$ co-precipitation, the nickel precursor nickel (II) nitrate hexahydrate ($N_2NiO_6.6H_2O$) was added to ethanol with the other precursors according to the required amount of each composition (composition is based on weight percentages for the total oxygen carrier i.e. metal+support), and the same procedure was followed for the remaining preparation steps.

Preparation of dual and mono catalysts using the impregnation method was conducted by first determining the specific catalyst composition.

For the preparation of $WO_3/ZrO_2$ using the impregnation method, distilled water was used to soak ammonium metatungstate (($NH_4)_6(H_2W_{12}O_{40})$) and commercial zirconia ($ZrO_2$). The solution was continuously mixed for 24 hours and then the sample was heated to evaporate the water by maintaining the mixture at a temperature of 75° C. The sample was then placed in an oven at 120° C. for 1 day, to promote complete drying, followed by sample grinding and calcination at 900° C. for 4 hours.

For NiO—$WO_3/ZrO_2$-impregnation, the nickel precursor nickel (II) nitrate hexahydrate ($N_2NiO_6.6H_2O$) was added to water with $(NH_4)_6(H_2W_{12}O_{40})$ and $ZrO_2$, to provide the required amounts for each composition. The solution was continuously mixed for 24 hours and then the sample was heated to evaporate the water by maintaining the mixture at a temperature of 75° C. The sample was then placed in an oven at 120° C. for 1 day, to promote complete drying, followed by sample grinding. The pure zirconia used to prepare the catalysts of various compositions was calcined at 900° C. for 4 hours.

All catalyst compositions described herein are based on weight percentages for the complete oxygen carrier catalyst. For example, it is to be understood that a composition indicated as "NiO(20%)-$WO_3$(20%)$ZrO_2$" will include 20% (w/w) NiO, 20% (w/w) $WO_3$ and 60% (w/w) $ZrO_2$.

Characterization of Catalysts and CLC Testing—The oxygen carrier catalysts were tested to assess their reduction and oxidation cycles for the CLC process using a PerkinElmer 8000 TGA (thermogravimetric analyzer) by loading 10 mg of oxidized catalyst into a platinum crucible and placing it in the designated sample holder at 50° C. Then, the analyzer was programmed to raise the temperature inside the chamber from 50° C. to 850° C. at a heating rate of 100° C./min with a nitrogen flow rate of 20 mL/min. The temperature was kept at 850° C. for 3 minutes before starting the CLC cycles. To reduce the oxygen carrier catalyst, the entering stream was switched to fuel. The fuel flow was controlled by a gas mixing device (GMD 8000 PerkinElmer) which was set to introduce 40% (vol.) of the entering flow of methane and 60% nitrogen (for safety reasons) with a total flow rate of 20 mL/min. The fuel oxidation (catalyst reduction) continued for 5 minutes before purging the chamber with nitrogen for 5 minutes at a flow rate of 20 mL/min. After that, the catalyst oxidation cycle was performed by switching the inlet stream to air at 20 mL/min. These three steps form one cycle (catalyst reduction, nitrogen purging, and catalyst oxidation), thereby completing the reduction and oxidation cycle. The reduction and oxidation cycle was repeated as required before cooling off the thermogravimetric analyzer to 50° C. once again. The sample weight percentage change was recorded with the increase in the weight of the catalyst during oxidation being due to oxygen sorption by the sample and weight loss during sample reduction being due to loss of oxygen for fuel combustion.

Characterization of the oxygen carriers by X-ray powder diffraction was performed using a Rigaku X-ray diffractometer (Multiflux 2 kW Copper target). The samples were placed horizontally on the sample holder. The samples were irradiated by Cu k-alpha radiation (wavelength of 1.5406 Å) to excite characteristic x-rays with two-theta diffraction angles ranging from 20-80 degrees, a 0.02 degree step, and a scanning rate of 2 degrees per minute. The equipment was operated with 40 kV voltage and 40 mA current. XRD patterns of various samples were obtained and analyzed for phase identification using the Jade 6 XRD MDI library.

Surface area and porosimetry measurements were performed using an ASAP 2020 porosimeter. Firstly, samples were degassed at 120° C. for 120 minutes to prepare the sample for analysis be removing any adsorbed surface moisture. Then, sample analysis was performed with $N_2$ adsorption-desorption in the analysis chamber, where the sample was submerged in liquid nitrogen.

The experimental oxygen carrying capacity was calculated as:

$$R_{exp} = \frac{W_{ox} - W_{red}}{W_{ox}} \times 100\% \qquad \text{(eq 3)}$$

Where: $W_{ox}$ is the weight of fully oxidized oxygen carrier catalyst,
$W_{red}$ is the weight of reduced oxygen carrier catalyst, and
$R_{exp}$ is the experimental oxygen carrying capacity.

TABLE 1

Oxygen Carrying Capacity for Unsupported and Supported Tungsten oxide and Dual Oxygen Carrier Catalyst with Varying $WO_3$ Loading

| Oxygen Carrier | Oxygen Carrying Capacity (%) |
|---|---|
| Bulk $WO_3$ | 0.175 |
| Calcined Zirconia | 0.023 |
| $WO_3(40\%)/ZrO_2$—Co-Precipitation | 0.414 |
| $WO_3(40\%)/ZrO_2$-Impregnation | 0.085 |
| NiO(20%)—$WO_3(20\%)/ZrO_2$—Co-Precipitation | 6.639 |
| NiO(20%)—$WO_3(20\%)/ZrO_2$-Impregnation | 5.825 |
| NiO(20%)/$ZrO_2$-Impregnation | 3.389 |
| NiO(20%)—$WO_3(5\%)/ZrO_2$-Impregnation | 3.188 |
| NiO(20%)—$WO_3(10\%)/ZrO_2$-Impregnation | 4.200 |
| NiO(20%)—$WO_3(15\%)/ZrO_2$-Impregnation | 4.187 |
| NiO(20%)—$WO_3(20\%)/ZrO_2$-Impregnation | 5.825 |
| NiO(20%)—$WO_3(25\%)/ZrO_2$-Impregnation | 6.484 |
| NiO(20%)—$WO_3(30\%)/ZrO_2$-Impregnation | 5.940 |
| NiO(20%)—$WO_3(35\%)/ZrO_2$-Impregnation | 5.847 |

The first cycle data obtained for oxygen carrying capacity of unsupported tungsten oxide, supported tungsten oxide via co-precipitation and impregnation along with dual metal oxide oxygen carrier catalyst with different percentages of $WO_3$ loading are listed in Table 1. The oxygen carrying capacity of bulk $WO_3$ is 0.175%, and $WO_3$ supported by co-precipitation has a capacity of 0.414% which higher than the capacity of the equivalent catalyst prepared by impregnation (0.085%). The zirconia was tested for its contribution towards the reaction, and it showed very low reactivity.

The co-precipitated dual oxygen carrier catalyst NiO (20%)-$WO_3(20\%)/ZrO_2$ has higher oxygen carrying capacity (6.639%) than the impregnated catalyst (5.825%). However, other factors such as stability and coke formation favor the impregnation method of preparation as discussed hereinbelow with respect to stability testing.

The impregnation method was used to further investigate the optimum compositions of the dual oxygen carrier catalyst. Optimal $WO_3$ loading was studied by starting with the single NiO/$ZrO_2$ oxygen carrier catalyst and then increasing the percentage of $WO_3$ loading. The single oxygen carrier catalyst NiO(20%)/$ZrO_2$ showed oxygen carrying capacity of 3.389% with coke formation. Adding 5% of $WO_3$ to the oxygen carrier resulted in 3.188% oxygen carrying capacity for the NiO(20%)-$WO_3(5\%)/ZrO_2$. However, further increasing the $WO_3$ loading was found to improve the oxygen carrying capacity to 4.200% and 4.187% for NiO (20%)-$WO_3(10\%)/ZrO_2$ and NiO(20%)-$WO_3(15\%)/ZrO_2$, respectively. Coke formation was found to persist up to $WO_3$ loading of 15%. Increasing the $WO_3$ loading to 20% in NiO(20%)-$WO_3(20\%)/ZrO_2$ resulted in elimination of coke formation and improved the oxygen carrying capacity to 5.825%. Further increases of the $WO_3$ percentage provided coke-free oxygen carrier catalysts and improved CLC performance. The optimum $WO_3$ loading was found to be 25% resulting in 6.484% capacity. Increasing the level of $WO_3$ loading beyond this point decreases the oxygen capacity as shown in Table 1.

The NiO loading was varied for the optimal 25% $WO_3$ loading to investigate the effect of the NiO loading on the oxygen carrying capacity. The results are shown in Table 2.

TABLE 2

Oxygen Carrying Capacity of Carriers with Varying NiO Loading and $WO_3$ Loading of 25% over $ZrO_2$

| Oxygen Carrier | Oxygen Carrying Capacity (%) |
|---|---|
| NiO(5%)—$WO_3(25\%)/ZrO_2$-Impregnation | 3.685 |
| NiO(10%)—$WO_3(25\%)/ZrO_2$-Impregnation | 4.232 |
| NiO(15%)—$WO_3(25\%)/ZrO_2$-Impregnation | 4.207 |
| NiO(20%)—$WO_3(25\%)/ZrO_2$-Impregnation | 6.484 |
| NiO(25%)—$WO_3(25\%)/ZrO_2$-Impregnation | 7.017 |
| NiO(30%)—$WO_3(25\%)/ZrO_2$-Impregnation | 8.068 |
| NiO(35%)—$WO_3(25\%)/ZrO_2$-Impregnation | 8.963 |
| NiO(40%)—$WO_3(25\%)/ZrO_2$-Impregnation | 11.047 |
| NiO(45%)—$WO_3(25\%)/ZrO_2$-Impregnation | 12.158 |
| NiO(50%)—$WO_3(25\%)/ZrO_2$-Impregnation | 13.383 |
| NiO(55%)—$WO_3(25\%)/ZrO_2$-Impregnation | 14.420 |
| NiO(60%)—$WO_3(25\%)/ZrO_2$-Impregnation | 15.642 |
| NiO(65%)—$WO_3(25\%)/ZrO_2$-Impregnation | 17.594 |
| NiO(70%)—$WO_3(25\%)/ZrO_2$-Impregnation | 17.970 |
| NiO(75%)—$WO_3(25\%)$-Impregnation | 19.490 |

Generally, increasing the NiO loading in the oxygen carrier enhances the oxygen carrier capacity. However, coke formation was observed for the NiO(65%)-$WO_3(25\%)$/$ZrO_2$, (70%)-$WO_3(25\%)/ZrO_2$ and (75%)-$WO_3(25\%)$ samples during CLC testing. This will be discussed further hereinbelow.

Stability of the Oxygen Carrier Catalysts in CLC—FIG. 1 shows the methane CLC performance over 3 cycles for calcined zirconia, bulk $WO_3$, and $WO_3$ supported on zirconia by impregnation and co-precipitation. Introduction of nitrogen produces the horizontal lines at the beginning of the experiment and between oxidation and reduction. The weight loss that occurs directly after the end of nitrogen flow is due to the introduction of methane, which promotes reduction of the oxygen carrier catalyst and weight loss. In cases where carbon formation occurs, the weight increase is seen in the second smaller peak. In the oxidation step, air is introduced into the system to combust the carbon that was previously formed during reduction of the catalyst, resulting in a decrease in the weight of the catalyst as a result of release of carbon. Then, formation of the metal oxide in the catalyst appears as weight gain. The number of cycles was repeated as many times as needed to test the oxygen carrier catalyst CLC performance and carbon deposition on the samples.

At first, the $WO_3$ bulk sample (prepared from thermal decomposition of tungstic acid) was tested for CLC in a TGA analysis over 3 cycles (FIG. 1). It was found that this sample has very low oxygen carrying capacity of less than 0.20%. To form a baseline for the supported samples, calcined commercial zirconia was analyzed by TGA as shown in FIG. 3, and it was found that, for each cycle, the oxygen carrying capacity is quote low due to the difficult reduction of $ZrO_2$ that requires very high temperatures.

Figure 3:
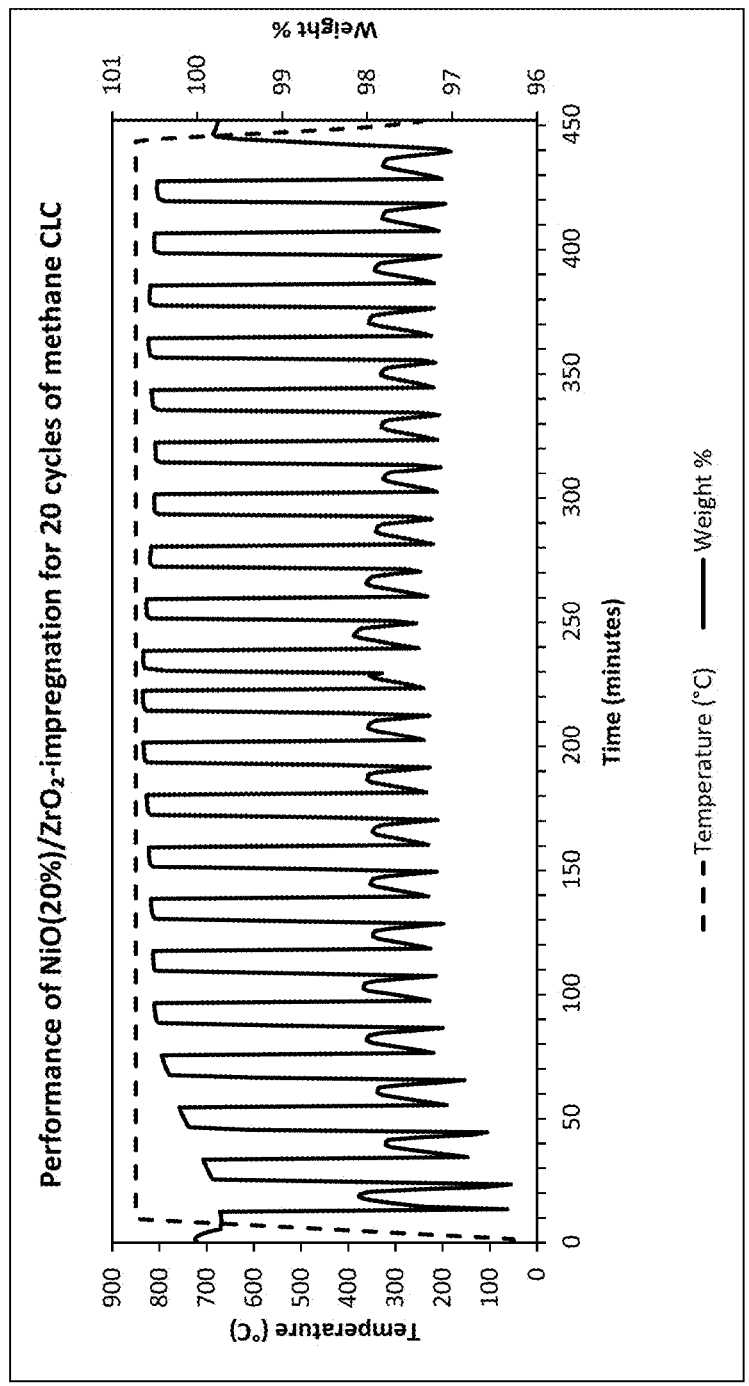
FIG. 3 is a plot of performance of NiO(20%)/$ZrO_2$ over 20 cycles of methane CLC.

The performance of catalysts formed of $WO_3$ dispersed on $ZrO_2$ prepared by the co-precipitation method and by the impregnation method are shown in FIG. 3. The loading of $WO_3$ in the total oxidized form of the catalyst used is 40% (w/w). The $R_{exp}$ value for the co-precipitated OC was about 0.78% which is higher than that of the impregnated catalyst. However, for both the co-precipitated and the impregnated $WO_3$ samples together with the bulk $WO_3$ showed very poor methane CLC performance because $WO_3$ has low reactivity in a methane environment.[6]

Figure 2:
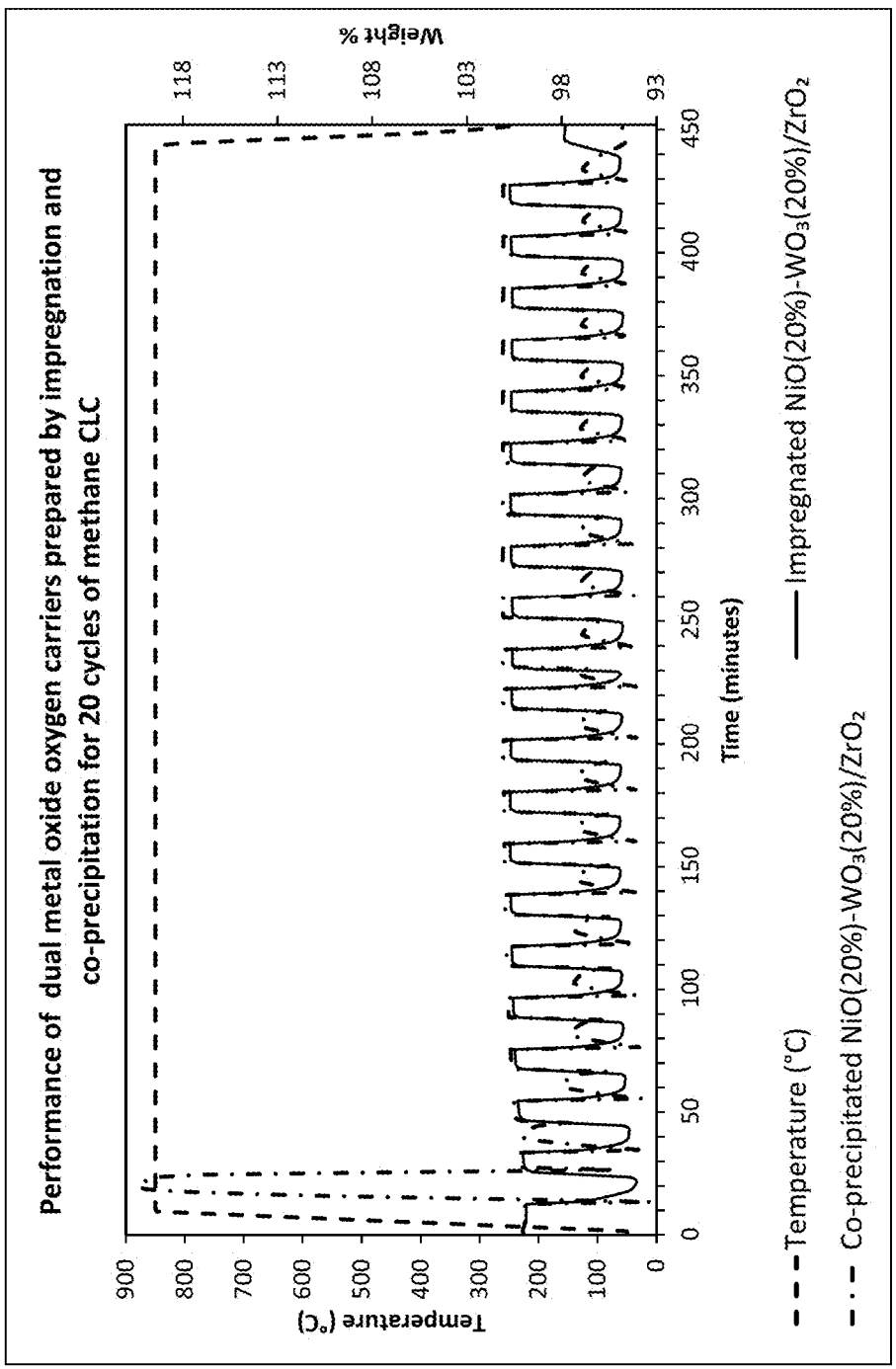
FIG. 2 is a plot of CLC performance of NiO(20%)-$WO_3$(20%)/$ZrO_2$ generated by co-precipitation and by impregnation.

After confirming the low reactivity of $WO_3$ for the methane CLC experiment, samples of NiO—$WO_3$ dispersed on $ZrO_2$ were tested as shown in FIG. 2. Oxygen carrier catalysts with a composition of 20% NiO, 20% $WO_3$ and 60% $ZrO_2$ were prepared by co-precipitation and impregnation and compared. In FIG. 2, it can be seen that the co-precipitated dual metallic oxide oxygen carrier catalyst has an oxygen carrying capacity of 6.77% for the first cycle, but a large amount of carbon was formed on this sample (about 20.37% (w/w)). With the start of air oxidation, the oxygen consumed to burn off the deposited carbon leads to a decrease in the weight of the catalyst, followed by formation of metal oxide that leads to a further increase in weight. For the second cycle, the oxygen carrying capacity was slightly reduced to 6.57% and carbon deposition by methane decomposition was also observed (about 6.43% of the oxidized sample). Similar to the oxidation of the first cycle, carbon was burnt in the second oxidation resulting in weight reduction of the sample that followed by formation of metal oxide and a weight increase. For the third cycle, the oxygen carrying capacity was observed to be 6.73% and the carbon formed for this cycle was 4.17% of the oxidized sample weight. The oxidation of this cycle led to the release of carbon and consumption of oxygen to form a metal oxide. A similar trend was observed for the other cycles and the oxygen carrying capacity for the 20th cycle slightly decreased to 6.44% and the carbon amount was 2.10%.

Also indicated in FIG. 2, the impregnated dual metallic oxide oxygen carrier catalyst showed oxygen carrying capacity of 6.00% for the first cycle of methane CLC, and this performance was found to be more stable compared to the co-precipitated dual catalyst with no formation of carbon observed. However, a decrease in the oxygen carrying capacity to 5.63% was observed in the second cycle, and 5.68% in the third cycle. The performance was stable for this catalyst, and a similar trend was observed for the remaining cycles. In the $20^{th}$ cycle, the oxygen carrying capacity was 5.81%. The catalyst formed by impregnation showed superior methane CLC performance compared to the co-precipitated sample in terms of stability and less carbon formation. Therefore, the impregnation method was selected over the co-precipitation method for preparing the oxygen carrier catalyst used in subsequent investigations described hereinbelow. Previous reports have indicated that the impregnation method is effective because it permits fast deposition of metals with high loadings and controllable preparation steps. Moreover, the preparation steps used for lab-scale investigations can be conveniently scaled up to a commercial scale. However, one principal drawback of the impregnation method is that loaded metal is non-uniformly distributed through the support.[14]

Different $WO_3$ loadings were added to the $NiO/ZrO_2$ catalyst using the impregnation method to study the effect of the dual oxygen carrier catalyst on CLC performance. The $NiO/ZrO_2$ catalyst with 20% (w/w) loading of NiO was used as a baseline catalyst modified by addition of $WO_3$ in the following percentages: 5%, 10%, 15% and 20%. The performance of $NiO(20\%)/ZrO_2$ for 20 CLC cycles is shown in FIG. 3, while the performance of a series of dual metallic oxygen carrier catalysts (by changing $WO_3$ loading) for 20 cycles of methane CLC are shown in FIGS. 4-10.

The TGA profile of the base material $NiO(20\%)/ZrO_2$ (FIG. 3) showed oxygen carrying capacity of about 3.39% in the first cycle. This capacity remained relatively constant over the 20 cycles. However, for the $NiO(20\%)/ZrO_2$ sample, formation of carbon was observed on the sample during the reduction of the catalyst as noted above. The percentage of the carbon formed in the first cycle was 1.64% (w/w) based on the oxidized sample and 1.70% (w/w) based on the reduced sample. The formation of carbon decreased with time and it was found to be 0.64% in the $20^{th}$ cycle. In the proposed CLC process, the carbon formed on the oxygen carrier catalyst in the fuel reactor is transported with the catalyst to the air reactor, where the carbon is released in the form of $CO_2$. This causes a reduction in $CO_2$ capture efficiency.[10]

Figure 4:
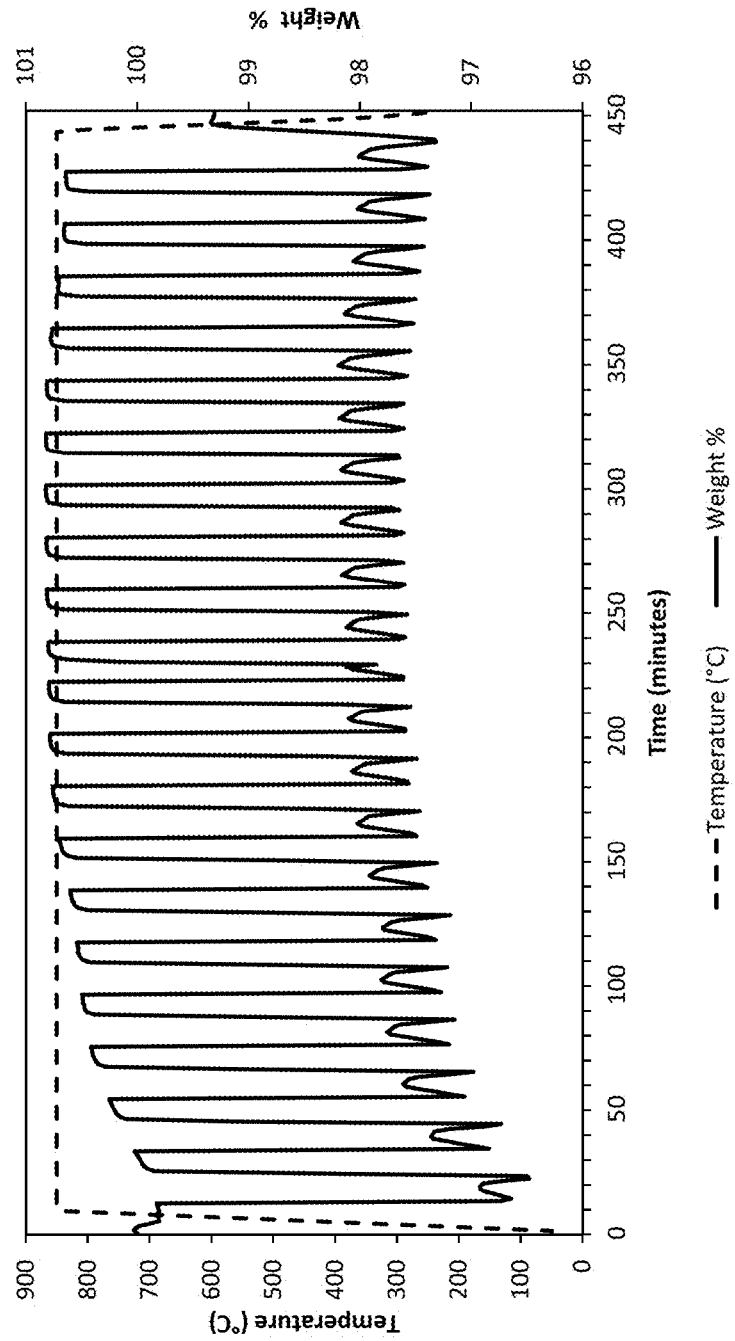
FIG. 4 is a plot of performance of NiO(20%)-$WO_3$(5%)/$ZrO_2$ (impregnation) over 20 cycles of methane CLC.

The addition of 5% $WO_3$ forms the $NiO(20\%)$-$WO_3(5\%)$/$ZrO_2$ dual oxygen carrier catalyst where the performance for 20 cycles is shown in FIG. 4. The oxygen capacity for this catalyst was found to be 3.20% in the first cycle. The oxygen carrying capacity oscillated around this value over the remaining cycles. However, carbon (coke) is formed on the catalyst, in an amount of 0.26% for the first cycle. The amount of carbon formed increased up to 0.49% for the second cycle (weight percentage based on the oxidized oxygen carrier catalyst). The amount of coke oscillated between 0.50% and 0.60%, indicating a reduction in the amount of carbon formation compared to the single metallic oxygen carrier catalyst.

Figure 5:
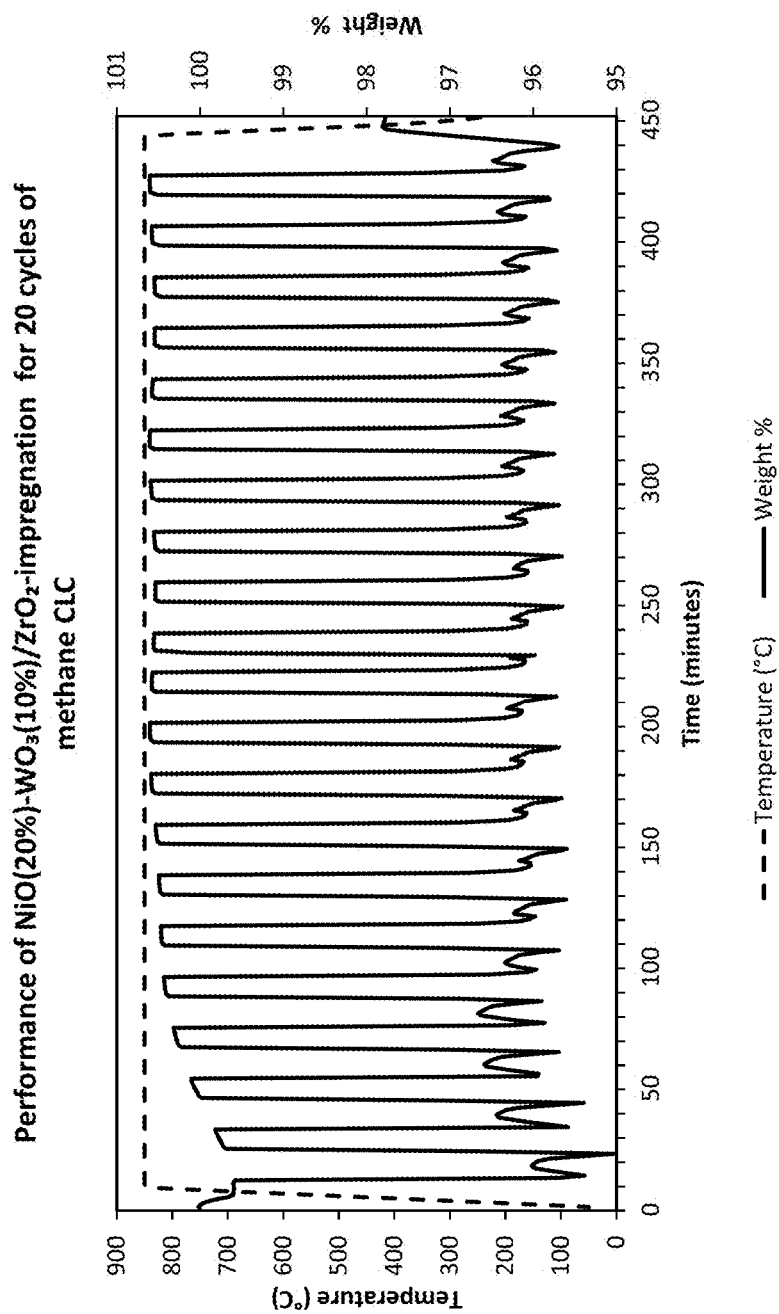
FIG. 5 is a plot of performance of NiO(20%)-$WO_3$(10%)/$ZrO_2$ (impregnation) over 20 cycles of methane CLC.

Increasing the loading of $WO_3$ to 10% forms the $NiO(20\%)$-$WO_3(10\%)$/$ZrO_2$ dual oxygen carrier catalyst. The performance of this catalyst for methane CLC over 20 cycles is shown in FIG. 5. The oxygen carrying capacity for the first cycle was 4.2%, showing 20% greater oxygen capacity than the single metallic oxide ($NiO(20\%)/ZrO_2$), The carbon formation for the first cycle was 0.60%. However, this percentage increased to 0.81% in the second cycle, and significantly decreased over the remaining cycles showing only 0.20% carbon formation in the $20^{th}$ cycle. On the other hand, the oxygen capacity increased in the second cycle reaching 4.24%, and later increased to 4.50% and remained relatively constant until the $20^{th}$ cycle.

Figure 6:
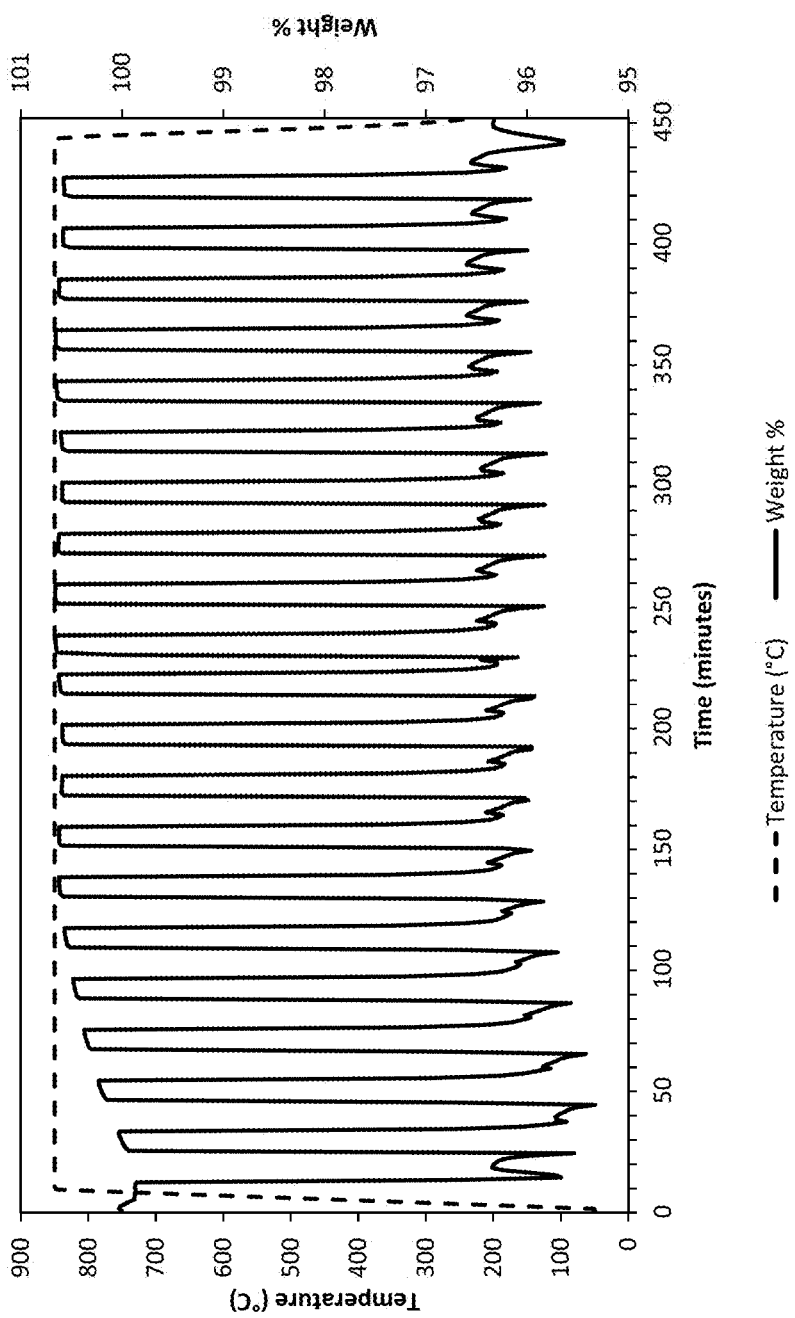
FIG. 6 is a plot of performance of NiO(20%)-$WO_3$(15%)/$ZrO_2$ (impregnation) over 20 cycles of methane CLC.

The performance of $NiO(20\%)$-$WO_3(15\%)$/$ZrO_2$ is shown in FIG. 6. The oxygen carrying capacity in the first cycle was 4.14% with 0.56% carbon formed on the catalyst. This carbon was burnt in the first oxidation step, and low carbon formation was observed for the remaining cycles (0.27% at the $20^{th}$ cycle). However, the oxygen capacity increased to 4.42%, in the second cycle and remained relatively constant until $20^{th}$ cycle (4.40%).

Figure 7:
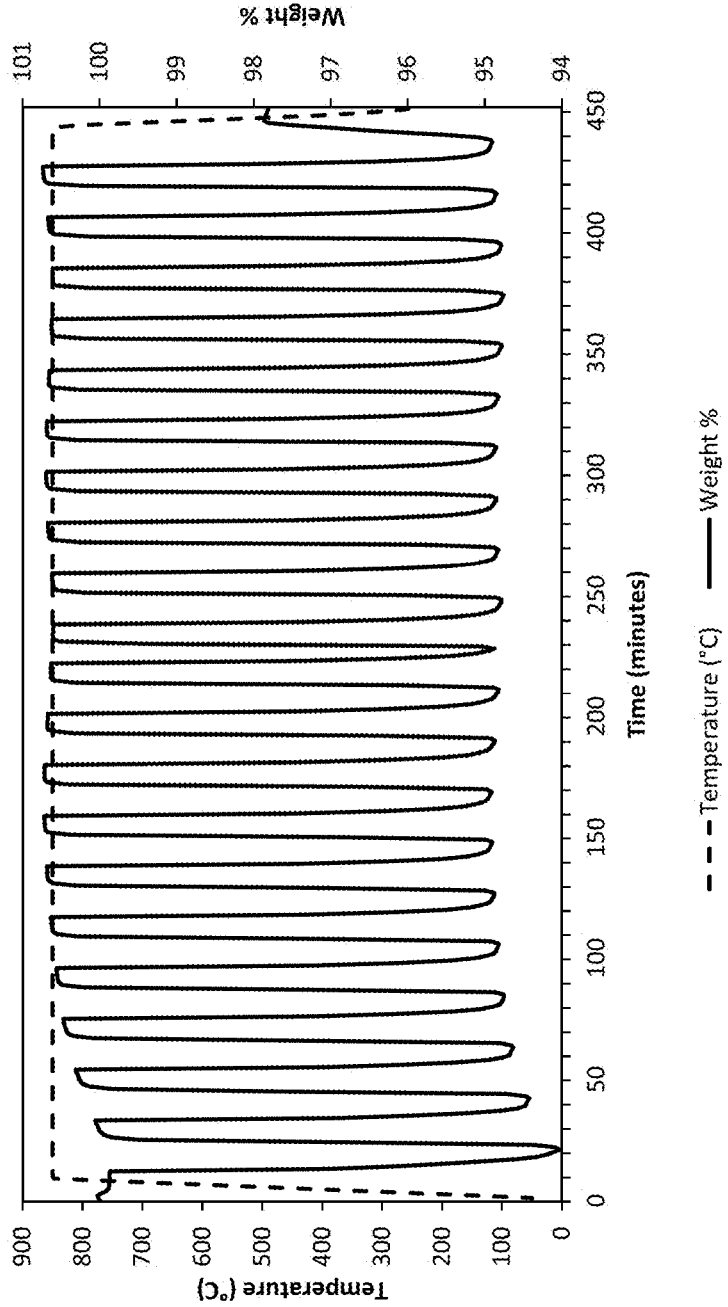
FIG. 7 is a plot of performance of NiO(20%)-$WO_3$(20%)/$ZrO_2$ (impregnation) over 20 cycles of methane CLC.

The performance of $NiO(20\%)$-$WO_3(20\%)$/$ZrO_2$ is shown in FIG. 7. Importantly formation of carbon was not observed. The oxygen carrying capacity in the first cycle was 6.00%. However, this capacity dropped to 5.63% in the second cycle and then increased in the remaining cycles. The oxygen carrying capacity was 5.81% in the 20th cycle.

Figure 8:
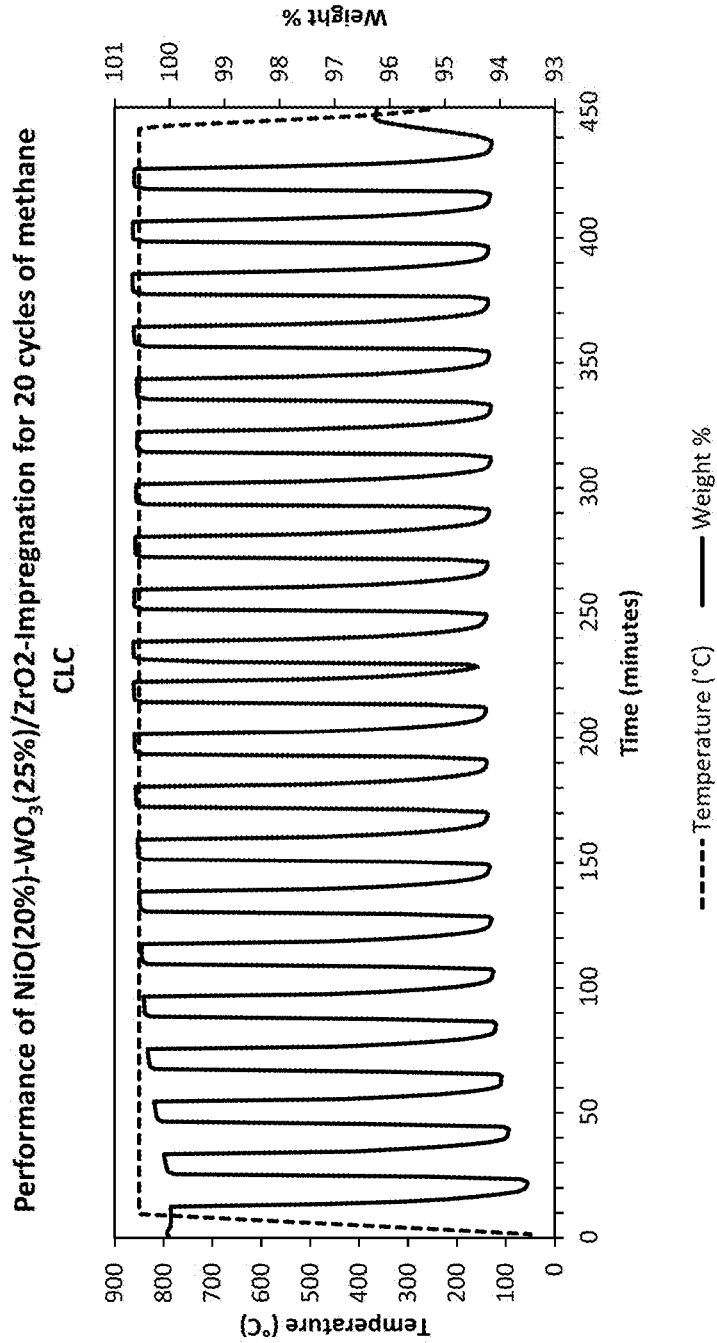
FIG. 8 is a plot of performance of NiO(20%)-$WO_3$(25%)/$ZrO_2$ (impregnation) over 20 cycles of methane CLC.
Figure 9:
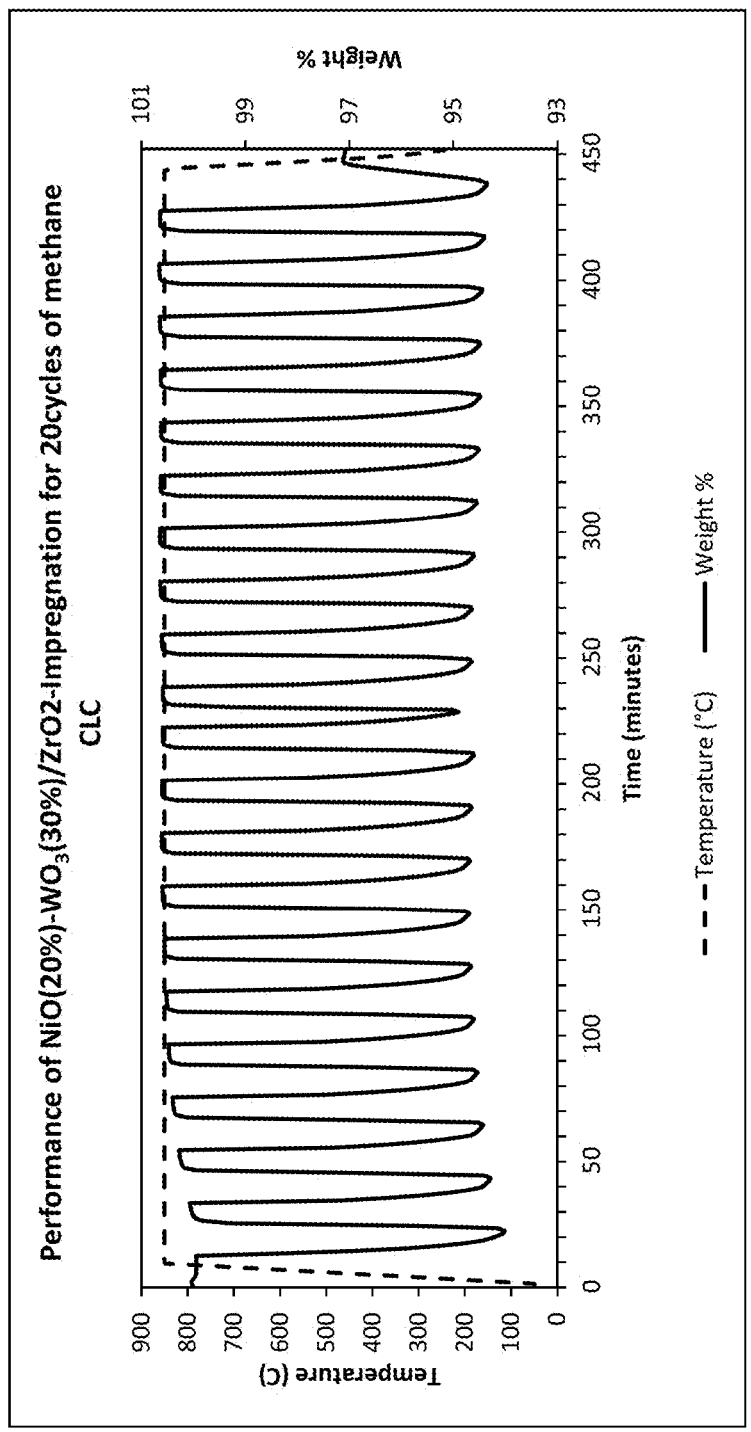
FIG. 9 is a plot of performance of NiO(20%)-$WO_3$(30%)/$ZrO_2$ (impregnation) over 20 cycles of methane CLC.
Figure 10:
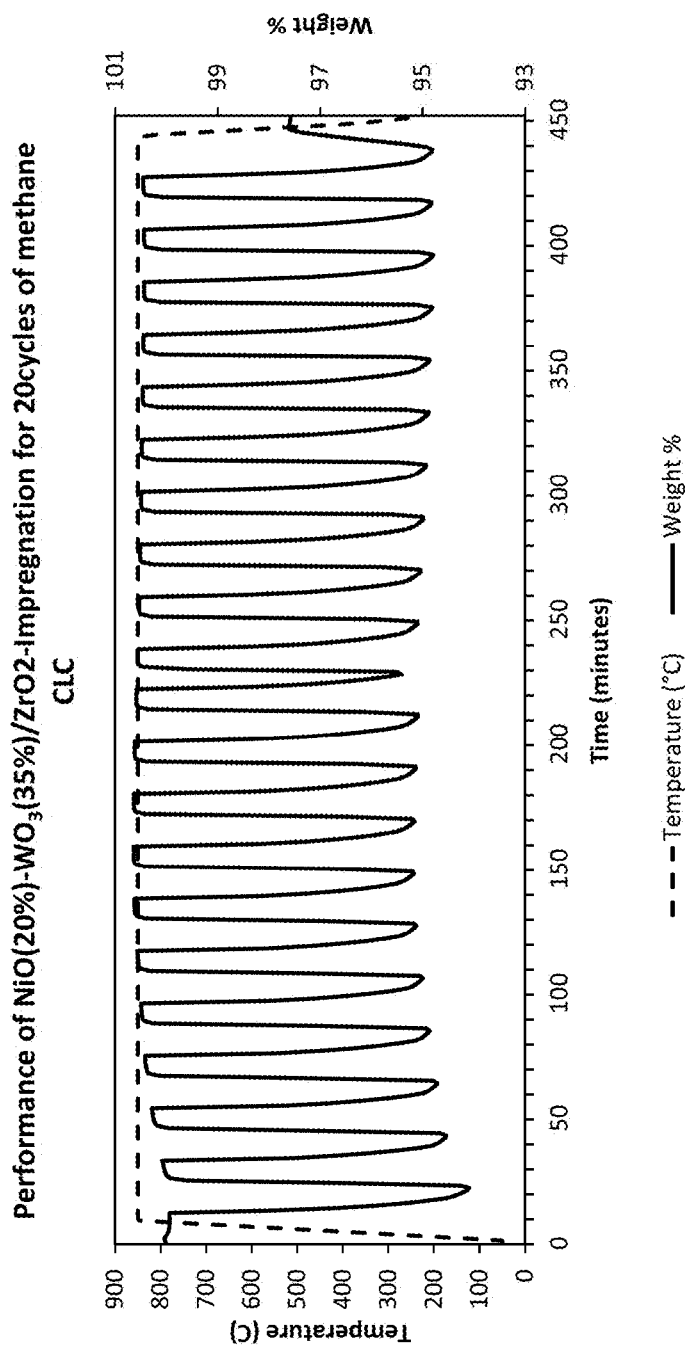
FIG. 10 is a plot of performance of NiO(20%)-$WO_3$(35%)/$ZrO_2$ (impregnation) over 20 cycles of methane CLC.

Similar performance was observed for $NiO(20\%)$-$WO_3(25\%)$/$ZrO_2$, $NiO(20\%)$-$WO_3(30\%)$/$ZrO_2$ and $NiO(20\%)$-$WO_3(35\%)$/$ZrO_2$ samples with the oxygen carrying capacity beginning to decrease when the loading of $WO_3$ exceeded 25%, as observed in FIGS. 8-10.

Figure 11:
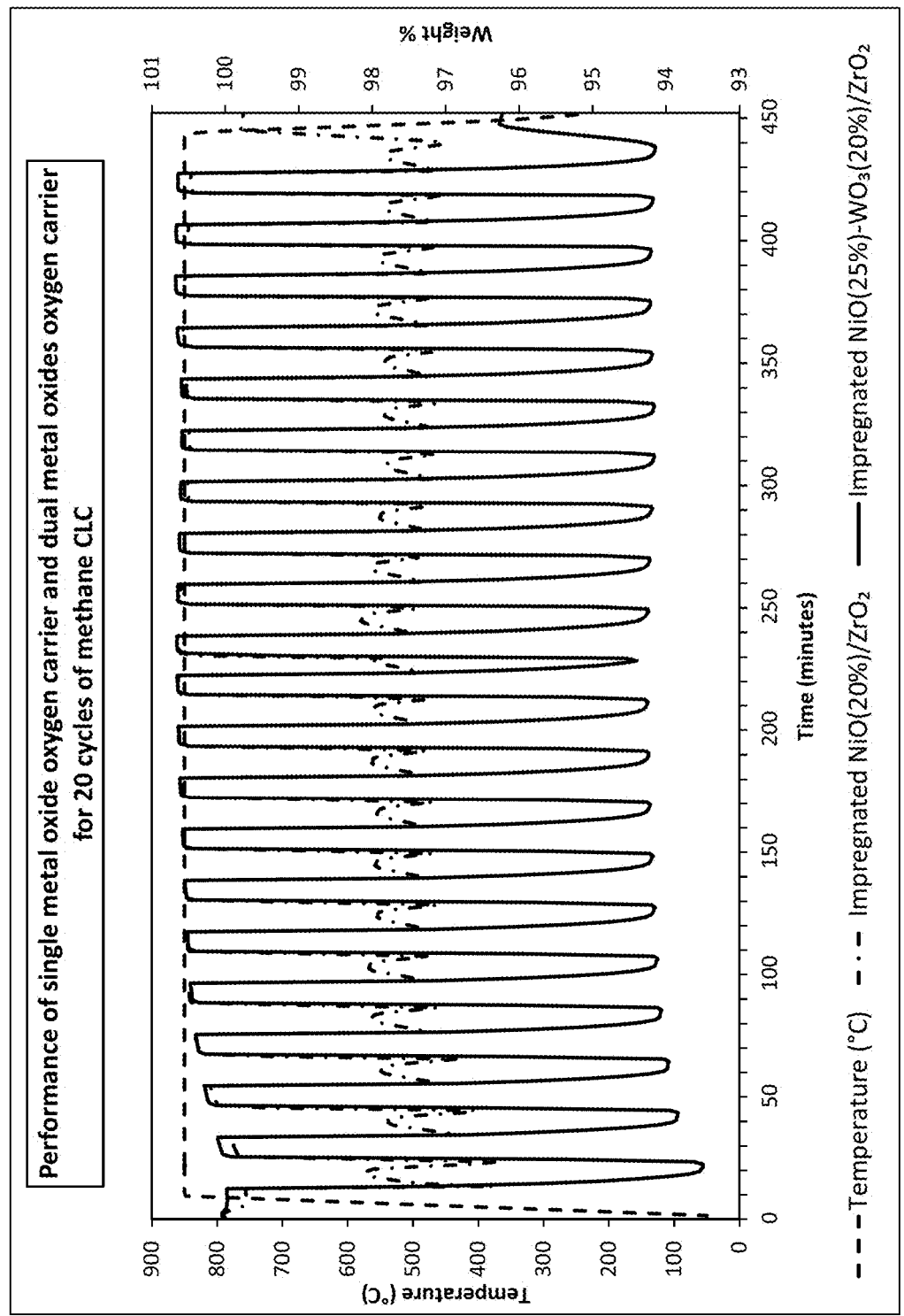
FIG. 11 is a plot of performance of impregnated single metal oxide oxygen carrier catalyst and impregnated dual metal oxide oxygen carrier catalyst for 20 cycles of methane CLC.
Figure 12:
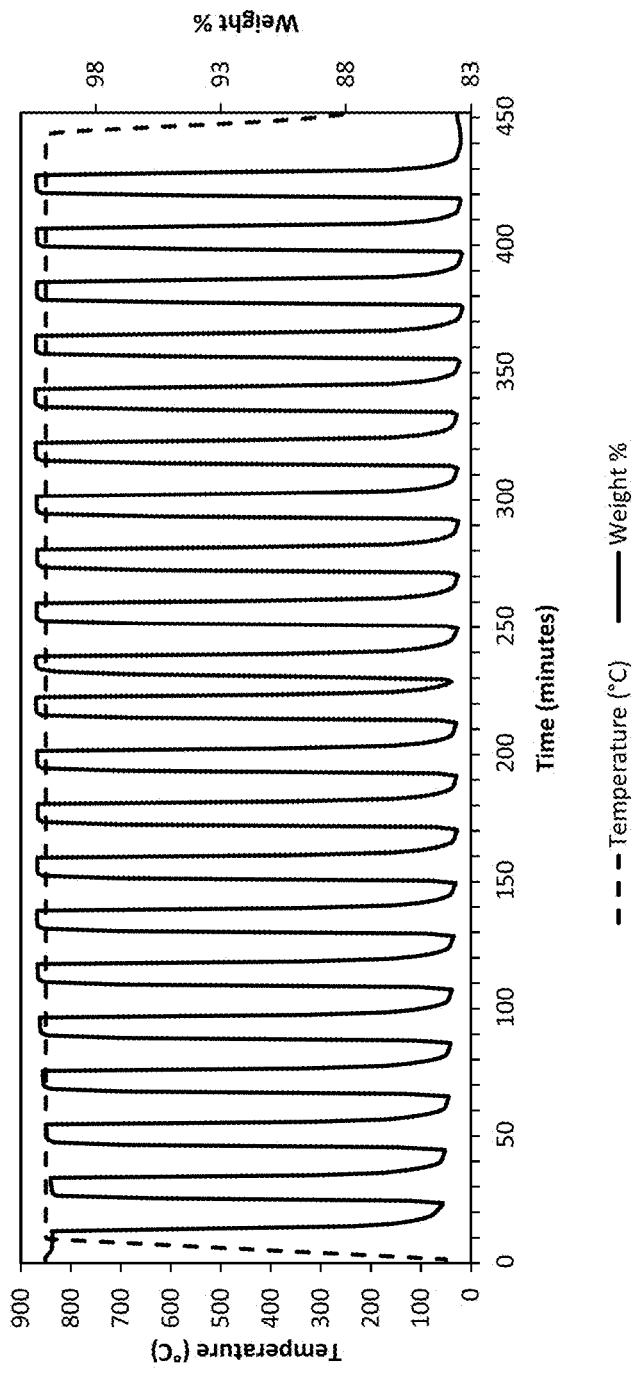
FIG. 12 is a plot of performance of NiO(60%)-$WO_3$(25%)/$ZrO_2$ (impregnation) for 20 cycles of methane CLC.
Figure 13:
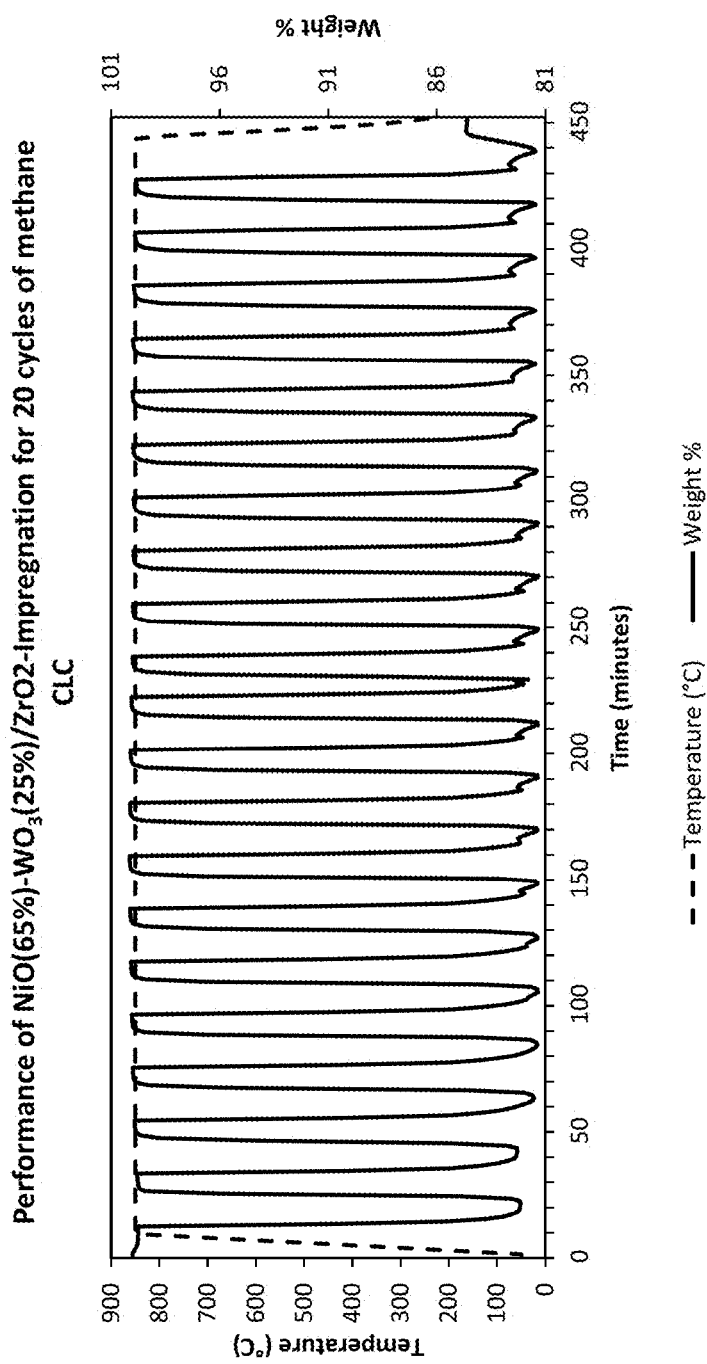
FIG. 13 is a plot of performance of NiO(65%)-$WO_3$(25%)/$ZrO_2$ (impregnation) for 20 cycles of methane CLC.
Figure 14:
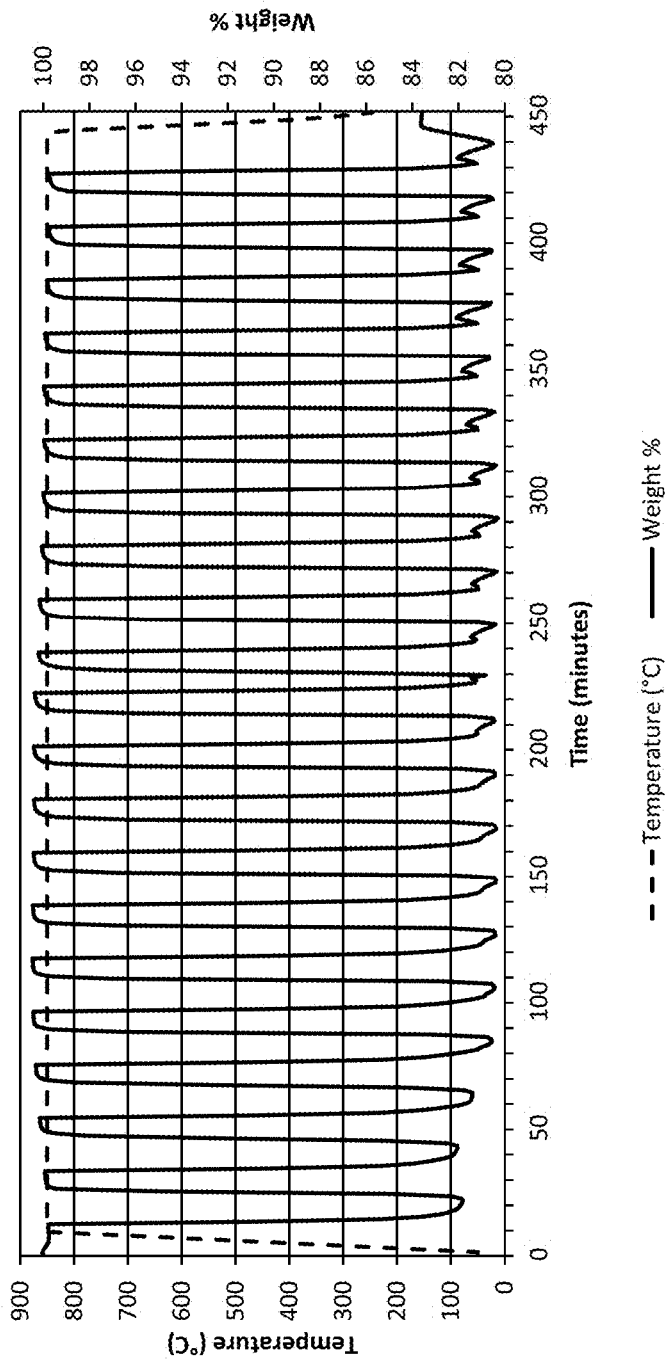
FIG. 14 is a plot of performance of NiO(70%)-$WO_3$(25%)/$ZrO_2$ (impregnation) for 20 cycles of methane CLC.
Figure 15:
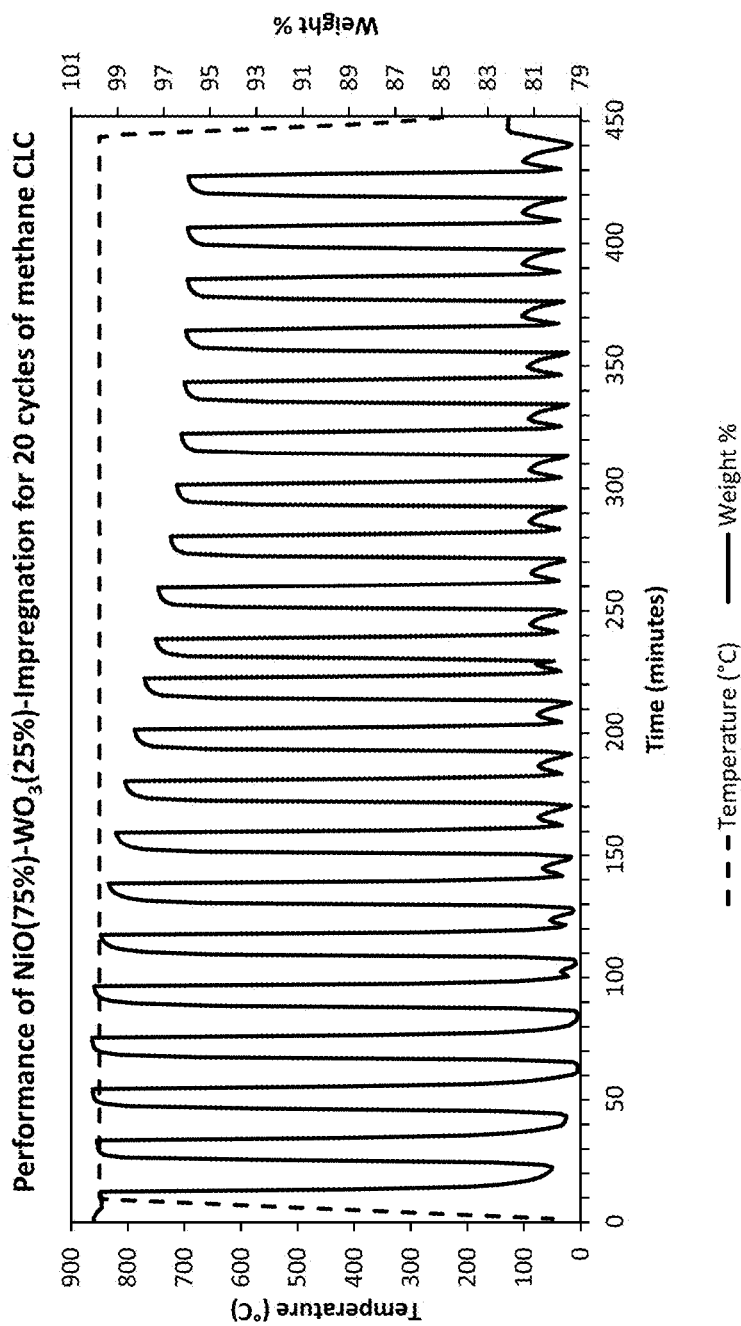
FIG. 15 is a plot of performance of unsupported NiO(75%)-$WO_3$(25%) (impregnation) for 20 cycles of methane CLC.

A comparison between the baseline oxygen carrier catalyst ($NiO(20\%)/ZrO_2$) and the dual oxygen carrier catalyst ($NiO(20\%)$-$WO_3(25\%)$/$ZrO_2$) is shown in FIG. 11. Importantly, carbon formation was not observed for the dual oxygen carrier catalyst ($NiO(20\%)$-$WO_3(25\%)$/$ZrO_2$). Moreover, the reactivity of the dual oxygen carrier catalyst ($NiO(20\%)$-$WO_3(25\%)$/$ZrO_2$) is higher than that of the single oxygen carrier catalyst ($NiO(20\%)/ZrO_2$). In the first cycle, the oxygen carrying capacity of the dual oxygen carrier was found to be 75% higher than that of the single oxygen carrier catalyst. However, the reactivity of the single oxygen carrier is stable throughout the 20 cycles, while the reactivity of the dual oxygen carrier catalyst decreases slightly for the first 3 cycles and then remains stable for the remaining cycles. The oxygen carrying capacity of the dual oxygen carrier catalyst is much higher than that of the single oxygen carrier catalyst for each cycle.

Further testing was conducted to assess the effect of changing the amount NiO loading while keeping the amount of $WO_3$ loading constant at 25%, which represents an optimal amount of loaded $WO_3$. The oxygen carrier catalysts range from 5% NiO to 75% NiO loading. The NiO(5%)-$WO_3$(25%)/$ZrO_2$ sample through NiO(60%)-$WO_3$(25%)/$ZrO_2$ sample showed no carbon formation for 20 cycles of CLC (data not shown). The addition of 65% loading of NiO in the NiO(65%)-$WO_3$(25%)/$ZrO_2$ and 75% NiO loading in the NiO(70%)-$WO_3$(25%)/$ZrO_2$, as well as the unsupported NiO(75%)-$WO_3$(25%) sample showed formation of carbon during the 20 cycles of CLC testing. Data indicating CLC performance for NiO(60%)-$WO_3$(25%)/$ZrO_2$, NiO(65%)-$WO_3$(25%)/$ZrO_2$, NiO(70%)-$WO_3$(25%)/$ZrO_2$ and unsupported NiO(75%)-$WO_3$(25%) are shown in FIGS. 14, 15, 16 and 17, respectively.

Porosimetry and Surface Area Analyses—Porosimetry and surface area analyses for the single oxide oxygen carrier catalysts and dual oxygen carrier catalysts with varying amounts of $WO_3$ loading are shown in Table 3.

TABLE 3

Porosimetry and Surface Area Analysis for Unsupported and Supported Tungsten Oxide and Dual Oxygen Carrier Catalyst with Varying Loading of $WO_3$

| Oxygen Carrier | BET Surface Area (m²/g) | Pore Volume (cm³/g) | Adsorption Average Pore Width (4V/A by BET) Å |
|---|---|---|---|
| Bulk $WO_3$ | 1.4379 | 0.0025 | 71 |
| Calcined Zirconia | 2.9358 | 0.0129 | 175 |
| $WO_3$(40%)/$ZrO_2$—Co-Precipitation | 2.3191 | 0.0119 | 206 |
| $WO_3$(40%)/$ZrO_2$-Impregnation | 2.1415 | 0.0078 | 146 |
| NiO(20%)—$WO_3$(20%)/$ZrO_2$—Co-Precipitation | 8.0140 | 0.0466 | 233 |
| NiO(20%)—$WO_3$(20%)/$ZrO_2$-Impregnation | 6.4671 | 0.0486 | 300 |
| NiO(20%)/$ZrO_2$-Impregnation | 6.6557 | 0.0403 | 242 |
| NiO(20%)—$WO_3$(5%)/$ZrO_2$-Impregnation | 6.2038 | 0.0459 | 296 |
| NiO(20%)—$WO_3$(10%)/$ZrO_2$-Impregnation | 4.1433 | 0.0300 | 289 |
| NiO(20%)—$WO_3$(15%)/$ZrO_2$-Impregnation | 5.8857 | 0.0419 | 285 |
| NiO(20%)—$WO_3$(20%)/$ZrO_2$-Impregnation | 6.4671 | 0.0486 | 300 |
| NiO(20%)—$WO_3$(25%)/$ZrO_2$-Impregnation | 5.0294 | 0.0351 | 279 |
| NiO(20%)—$WO_3$(30%)/$ZrO_2$-Impregnation | 6.8198 | 0.0380 | 223 |
| NiO(20%)—$WO_3$(35%)/$ZrO_2$-Impregnation | 6.1018 | 0.0361 | 237 |

The Brunauer-Emmett-Teller (BET) surface area calculated for unsupported and supported tungsten oxide and dual oxygen carrier catalysts with different tungsten loading is shown in Table 3. Bulk $WO_3$ was found to have the smallest surface area. The calcined commercial zirconia support has a surface area of 2.94 m²/g. This surface area was found to decrease when the $WO_3$ was dispersed on the support using both co-precipitation and impregnation methods. However, $WO_3$(40%)/$ZrO_2$ prepared using the impregnation method was found to have a smaller surface area than the catalyst prepared using the co-precipitation method. When comparing the dispersion of NiO on zirconia with the dispersion of $WO_3$, it can be seen that the NiO(20%)/$ZrO_2$ prepared by impregnation has a greater surface area than the zirconia support. For the dual metallic oxygen carrier catalyst (NiO(20%)-$WO_3$(20%)/$ZrO_2$), the sample prepared by co-precipitation has a higher BET surface area than the same catalyst prepared by impregnation. For comparison of the different $WO_3$ loadings in the NiO(20%)/$ZrO_2$ sample, the catalyst with 5% $WO_3$ slightly decreases the BET surface area from 6.66 m²/g to 6.20 m²/g. Further increasing loading of $WO_3$ to 10% significantly decreases the surface area to 4.14 m²/g. Then, for the 15% and 20% $WO_3$ loadings, the surface area increases to 5.89 m²/g and 6.47 m²/g, respectively. The NiO(20%)-$WO_3$(25%)/$ZrO_2$ surface area was found to be lower than that of NiO(20%)-$WO_3$(20%)/$ZrO_2$. Further increases in $WO_3$ loading to 30% increases the surface area to 6.8198 m²/g, but then additional loading of $WO_3$ causes a decrease in surface area to 6.1018 m²/g.

The pore volume and the adsorption average pore width of the tested samples are also shown in Table 3. Generally, a trend similar to the surface area trend was observed. Bulk $WO_3$ has the lowest pore volume and pore width among all measurements. The calcined commercial zirconia has a pore volume of 0.0129 cm³/g and an average pore width of 175 Å. Samples of $WO_3$ supported on commercial zirconia have a smaller pore volume regardless of the preparation method. However, the average pore width is higher for the sample prepared by co-precipitation (206 Å). The dual metallic oxygen carrier catalyst (NiO(20%)-$WO_3$(20%)/$ZrO_2$) prepared by impregnation has a greater pore width (300 Å) compared to the same sample prepared by co-precipitation (233 Å). For the dual metallic OC prepared by impregnation, the NiO(20%)-$WO_3$(10%) catalyst was found to have a small pore volume of 0.03000 cm³/g, and increasing the amount of loading of $WO_3$ did not significantly change the pore volume. However, these pore volumes remain generally higher than the pore volume of NiO(20%)/$ZrO_2$ (0.0403 cm³/g).

Porosimetry and surface area analyses for carriers with varying NiO loadings and $WO_3$ loading of 25% supported by $ZrO_2$ are shown in Table 4.

TABLE 4

Porosimetry and Surface Area Analysis for Supported Tungsten Oxide and Dual Oxygen Carrier Catalyst with Varying Loading of NiO and 25% $WO_3$

| Oxygen Carrier | BET Surface Area (m²/g) | Pore Volume (cm³/g) | Adsorption Average Pore Width (4V/A by BET) Å |
|---|---|---|---|
| NiO(5%)—$WO_3$(25%)/$ZrO_2$-Impregnation | 3.0493 | 0.0109 | 144 |
| NiO(10%)—$WO_3$(25%)/$ZrO_2$-Impregnation | 3.7899 | 0.0188 | 198 |
| NiO(15%)—$WO_3$(25%)/$ZrO_2$-Impregnation | 6.0964 | 0.0397 | 261 |
| NiO(20%)—$WO_3$(25%)/$ZrO_2$-Impregnation | 5.0294 | 0.0351 | 279 |
| NiO(25%)—$WO_3$(25%)/$ZrO_2$-Impregnation | 7.9521 | 0.0530 | 267 |
| NiO(30%)—$WO_3$(25%)/$ZrO_2$-Impregnation | 8.8176 | 0.0607 | 276 |
| NiO(35%)—$WO_3$(25%)/$ZrO_2$-Impregnation | 10.3766 | 0.0692 | 267 |
| NiO(40%)—$WO_3$(25%)/$ZrO_2$-Impregnation | 10.9212 | 0.0686 | 251 |
| NiO(45%)—$WO_3$(25%)/$ZrO_2$-Impregnation | 11.614 | 0.0631 | 217 |
| NiO(50%)—$WO_3$(25%)/$ZrO_2$-Impregnation | 12.6393 | 0.0735 | 233 |

TABLE 4-continued

Porosimetry and Surface Area Analysis for Supported
Tungsten Oxide and Dual Oxygen Carrier Catalyst
with Varying Loading of NiO and 25% $WO_3$

| Oxygen Carrier | BET Surface Area (m$^2$/g) | Pore Volume (cm$^3$/g) | Adsorption Average Pore Width (4V/A by BET) Å |
|---|---|---|---|
| NiO(55%)—WO$_3$(25%)/ZrO$_2$-Impregnation | 13.8885 | 0.0916 | 264 |
| NiO(60%)—WO$_3$(25%)/ZrO$_2$-Impregnation | 16.7199 | 0.0939 | 225 |
| NiO(65%)—WO$_3$(25%)/ZrO$_2$-Impregnation | 16.8747 | 0.0908 | 215 |
| NiO(70%)—WO$_3$(25%)/ZrO$_2$-Impregnation | 15.6013 | 0.0847 | 217 |
| NiO(75%)—WO$_3$(25%)-Impregnation | 14.1919 | 0.0746 | 210 |

The surface area of dual oxygen carrier catalysts with varying amounts of NiO loading was found to increase with increasing the NiO loading from 5% up to 65% with the highest surface area of 16.8747 m$^2$/g for the NiO(65%)-WO$_3$(25%)/ZrO$_2$. Moreover, the surface area is 15.6031 m$^2$/g for NiO(65%)-WO$_3$(25%)/ZrO$_2$ with only 5% of the sample comprising the ZrO$_2$ support. A further decrease of the surface area to 14.1919 m$^2$/g was observed for the unsupported NiO(75%)-WO$_3$(25%).

Regarding the pore volume of the oxygen carriers with varying NiO loading and WO$_3$ loading of 25%, the general trend observed was an increase of pore volume with NiO loading peaking at 60% NiO loading (0.0939 cm$^3$/g) after which the pore volume decreases with increasing NiO loading.

The average pore size of the oxygen carrier catalysts with varying NiO loading and WO$_3$ loading of 25% was found to increase with increasing the amount of NiO loading between 5% and 20%. However, further increases in NiO loading resulted in fluctuations in the average pore size with a decreasing trend with increasing in NiO loading. The observed change of the BET surface area and pore structure of the samples could be related to effects arising from the preparation methods and the change of the phases formed on oxygen carrier catalysts, as outlined demonstrated hereinbelow with respect to the results of XRD analyses).

Figure 16:
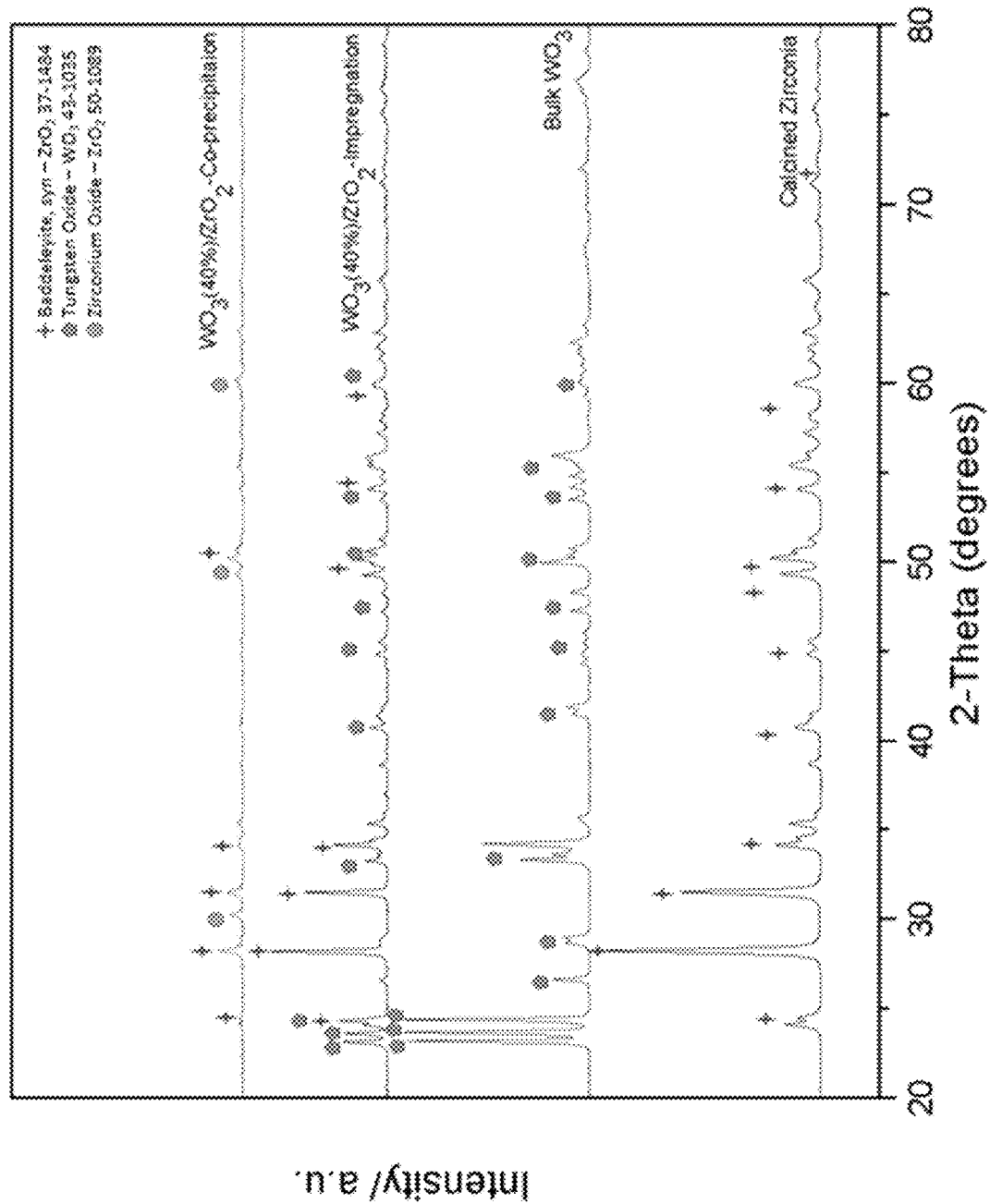
FIG. 16 shows a series of X-ray diffraction (XRD) analyses of calcined zirconia, bulk $WO_3$, $WO_3$ (40%)/$ZrO_2$ (impregnation), and $WO_3$(40%)/$ZrO_2$ (co-precipitation).

X-Ray Powder Diffraction Analyses—X-ray powder diffraction (XRD) patterns are shown in FIGS. 16-19. FIG. 16 shows the diffraction patterns for the calcined zirconia, bulk WO$_3$ and tungsten oxide WO$_3$(40%) supported by zirconia prepared by impregnation and WO$_3$(40%) supported by zirconia prepared by co-precipitation. The phase identification, performed using MDI Jaded 6, was based on the chemical components involved and the Figure of Merits (FOM) of suggested phases. Firstly, the calcined commercial zirconia was analyzed to form a baseline for the supported samples. The calcined zirconia diffraction pattern generally matched the baddeleyite, syn-ZrO$_2$ phase (37-1484 JCPDS card) (Joint Committee on Powder Diffraction Standards). The bulk WO$_3$ diffraction pattern was in accordance with the characteristic pattern of the monoclinic structure of tungsten oxide (43-1035 JCPDS card). The tungsten oxide and the baddeleyite (ZrO$_2$) phases appear in the WO$_3$(40%)/ZrO$_2$ sample prepared by impregnating commercial zirconia with ammonium meta tungstate ((NH$_4$)$_6$(H$_2$W$_{12}$O$_{40}$)). The XRD pattern generated for the sample of (WO$_3$(40%)/ZrO$_2$) prepared by co-precipitation using tungsten (VI) chloride (WCl$_6$) as a source of tungsten and zirconium (IV) oxynitrate hydrate (N$_2$O$_7$Zr.xH$_2$O) as a support precursor indicates the baddeleyite phase along with the zirconium oxide phase (50-1089 JCPDS card) with no phases of WO$_3$ formed. Moreover, the peaks from the co-precipitation method are wider and weaker.

Figure 17:
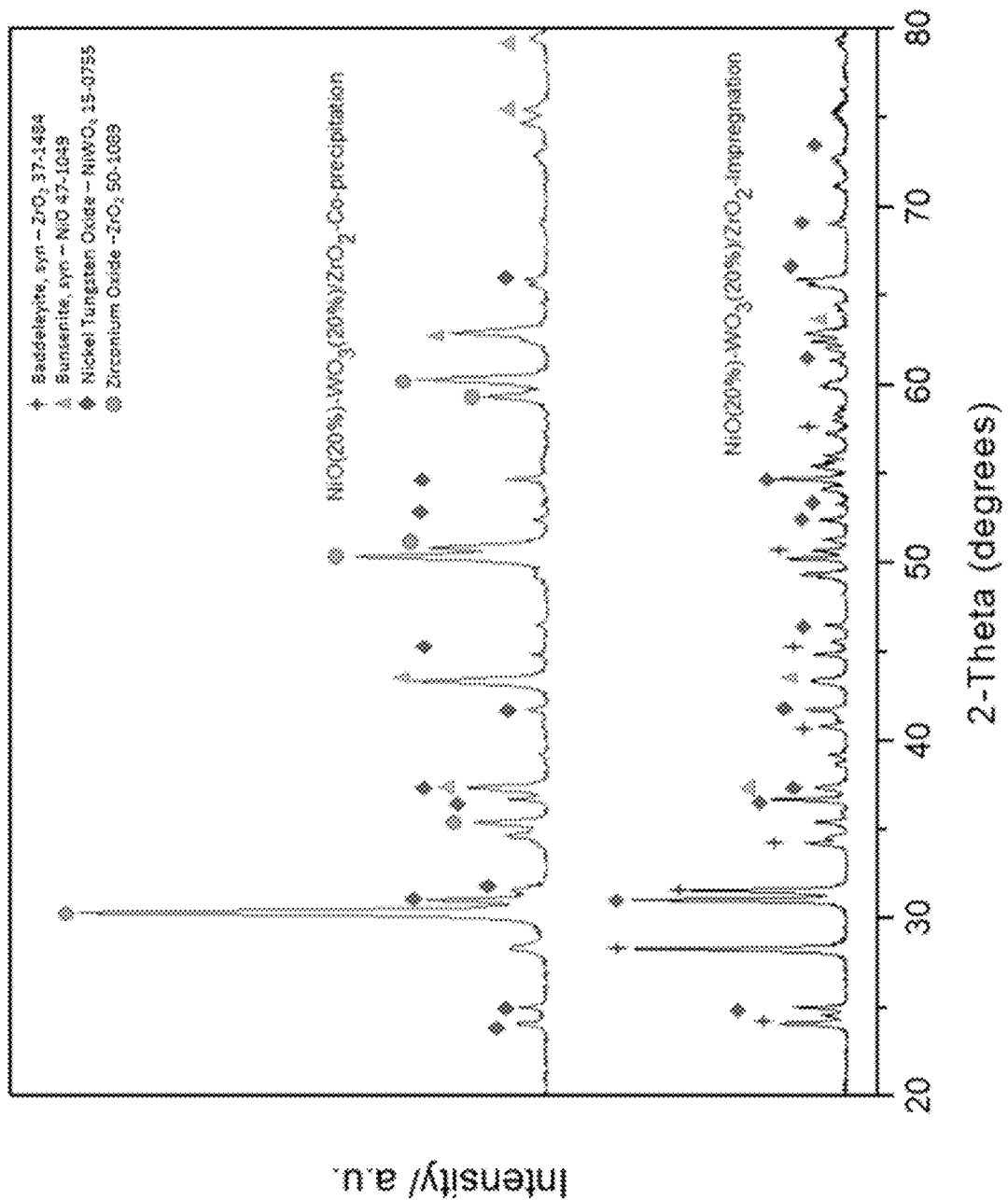
FIG. 17 shows a pair of XRD analyses of NiO(20%)-$WO_3$(20%)/$ZrO_2$ (impregnation), and NiO(20%)-$WO_3$(20%)/$ZrO_2$ (co-precipitation).

FIG. 17 shows a comparison of XRD patterns of the NiO(20%)-WO$_3$(20%)/ZrO$_2$-coprecipitation with NiO (20%)-WO$_3$(20%)/ZrO$_2$-impregnation. Both the co-precipitated and the impregnated samples do not indicate any formation of tungsten oxide phases. Bunsenite (NiO) and nickel tungsten oxide (NiWO$_4$) phases are observed. The zirconia phase observed (50-1089 JCPDS) for the co-precipitated sample is different from that of the impregnated sample (baddeleyite, ZrO$_2$).

Figure 18:
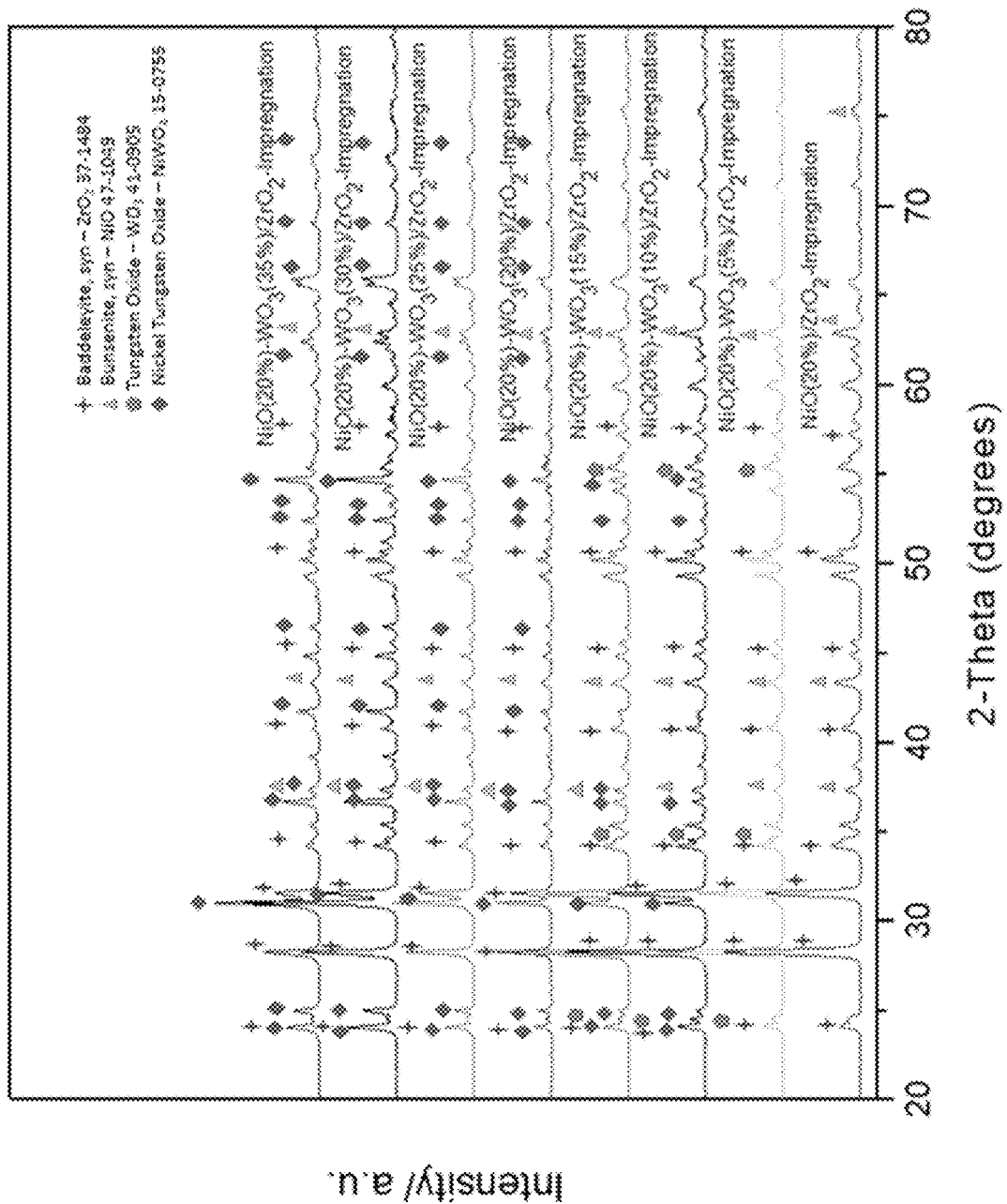
FIG. 18 shows a series of XRD analyses of supported dual oxygen carrier catalysts generated by impregnation with 20% NiO and variable percentages of $WO_3$.

FIG. 18 shows the XRD patterns of the dual mixed metallic oxide catalyst prepared by impregnation with loading of NiO kept constant at 20% and the WO$_3$ loading varying from 5% to 35%, starting with the supported NiO (20%)/ZrO$_2$-impregnation. The NiO phase is present as a bunsenite phase (NiO) (47-1049 JCPDS card) and the zirconia phase is present as a baddeleyite phase. The NiO (20%)-WO$_3$(5%)//ZrO$_2$-impregnation sample displayed the baddeleyite phase (ZrO$_2$), the bunsenite phase (NiO) and the tungsten oxide (WO$_3$) phase (41-0905 JCPDS card). Further WO$_3$ loading (NiO(20%)-WO$_3$(10%)/ZrO$_2$-impregnation) produced the same diffraction peaks with the formation of nickel tungsten oxide (NiWO$_4$) as a new phase (15-0755 JCPDS card). NiO(20%)-WO$_3$(15%)/ZrO$_2$-impregnation showed same phases observed in the NiO(20%)-WO$_3$(10%)/ZrO$_2$-impregnation sample with less intense ZrO$_2$ and tungsten oxide diffraction peaks. The NiO(20%)-WO$_3$(20%)/ZrO$_2$-impregnation sample has smaller peaks for the baddeleyite phase (the ZrO$_2$ support) and no peaks for tungsten oxide. The bunsenite (NiO) peak and the nickel tungsten oxide (NiWO$_4$) peak both have relatively higher intensities. Phases similar to those observed in NiO(20%)-WO$_3$(20%)/ZrO$_2$-impregnation were also observed in NiO (25%)-WO$_3$(20%)/ZrO$_2$-impregnation, NiO(30%)-WO$_3$ (20%)/ZrO$_2$-impregnation, and NiO(35%)-WO$_3$(20%)/ZrO$_2$-impregnation samples (see FIG. 19). However, the nickel tungsten oxide (NiWO$_4$) peaks were higher and stronger up to 30% NiO loading, while the baddeleyite peaks became weaker with increased loading of NiO. The NiO (20%)-WO$_3$(25%)/ZrO$_2$-impregnation sample showed the best performance with changing of the amount of WO$_3$ loading. This provided motivation to alter the amount of NiO loading while keeping the WO$_3$ loading constant at 25% (w/w), representing the optimal loading of WO$_3$.

Figure 19:
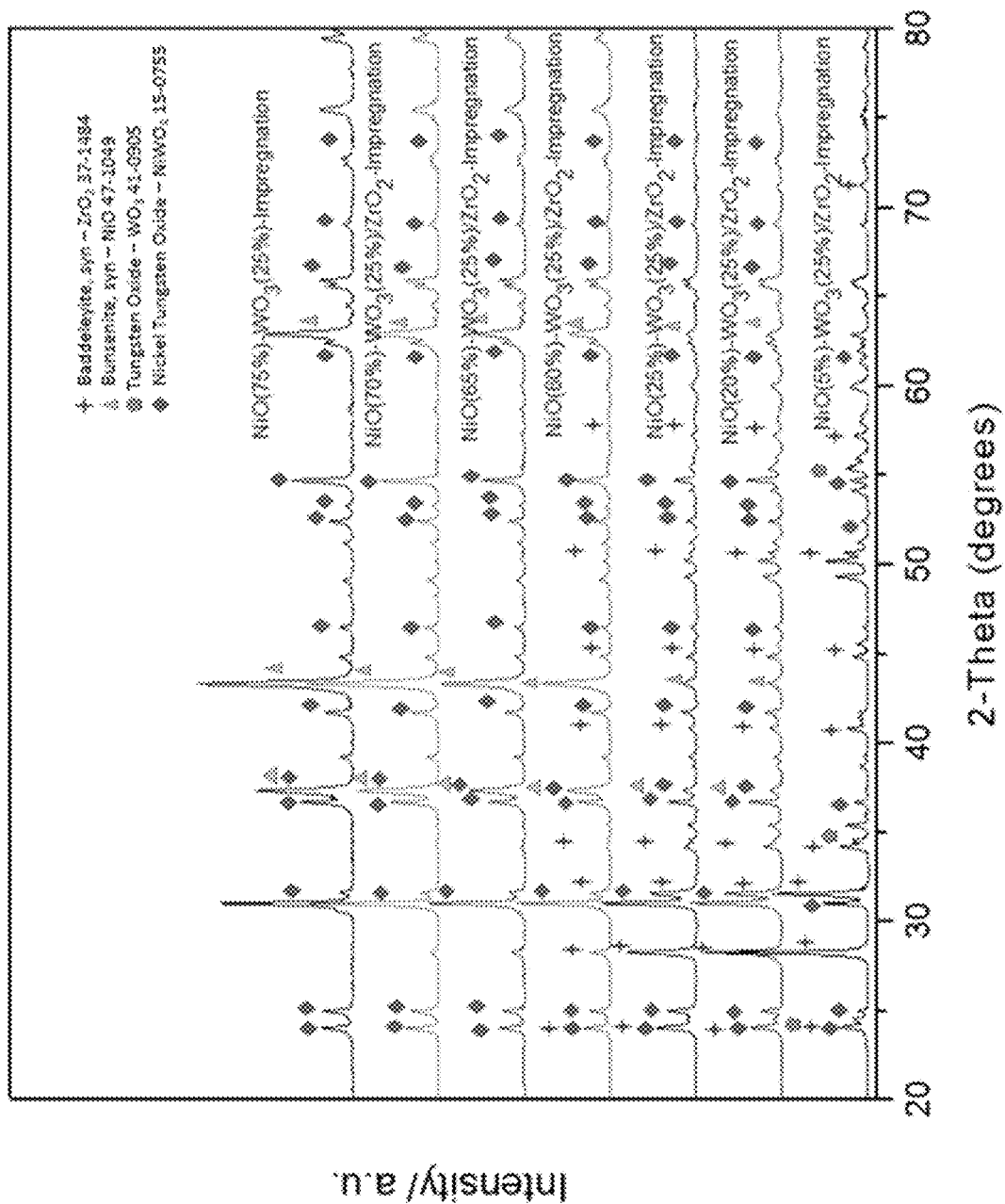
FIG. 19 shows a series of XRD analyses of supported dual oxygen carrier catalysts generated by impregnation with 25% $WO_3$ and variable percentages of NiO.

The XRD patterns of the dual metal oxide catalysts prepared by impregnation with constant WO$_3$ loading (25%) and varied NiO loading are shown in FIG. 19. For the NiO(5%)-WO$_3$(25%)/ZrO$_2$-impregnation sample, the baddeleyite, tungsten oxide and nickel tungsten oxide phases are visible. The tungsten oxide phase disappears with increased NiO loading. It was observed that tungsten oxide is involved in the formation of the nickel tungsten oxide (NiWO$_4$) phase. For NiO(20%)-WO$_3$(25%)/ZrO$_2$-impregnation, NiO(25%)-WO$_3$(25%)/ZrO$_2$-impregnation and NiO (60%)-WO$_3$(25%)/ZrO$_2$-impregnation samples, baddeleyite, bunsenite, and nickel tungsten oxide phases are visible. The baddeleyite phase peaks become weaker with increased metal oxide loading, and these peaks become very weak and broad for the NiO(65%)-WO$_3$(25%)/ZrO$_2$-impregnation and NiO(70%)-WO$_3$(25%)/ZrO$_2$-impregnation samples. Furthermore, the baddeleyite peaks disappear completely with NiO(75%)-WO$_3$(25%) because no support is present. On the other hand, the intensity of the bunsenite peaks and the nickel tungsten oxide peaks increases with increasing amounts of NiO loading.

As previously reported by Tijani et. al,[15] the thermally stable zirconia support (2715° C. melting point) does not show evidence of any interaction with the active metals, which facilitates the reduction of the metal oxides. However, upon increasing the loading of the $WO_3$ (to 10% and more) in the dual metallic oxygen carrier with 20% nickel loading, the nickel and tungsten become involved in a strong interaction with each other, resulting in formation of the $NiWO_4$ phase. The presence of this phase is believed to be related to the enhancement of the oxygen carrying capacity of samples in which this phase exists. It has been suggested that the $NiWO_4$ may be reduced by two different pathways[7]: (i) reduction of $NiWO_4$ into a $NiWO_x$ compound, and (ii) decomposition of $NiWO_4$ into NiO and $WO_3^*$ (which similar to the bulk $WO_3$), which are further reduced to Ni and $WO_y$. Among these two possibilities the decomposition pathway appears to be the most probable.

Scherrer's equation (equation 4) was used to estimate the crystal size of the samples:

$$<L> = \frac{K\lambda}{\beta \cos\theta} \quad \text{(eq 4)}$$

Where: <L> is the measure of the particle dimension in the direction normal to the reflecting plane
K is a constant (usually taken as 1)
λ is the wavelength of the X-rays used to excite the samples (0.15406 nm)
β is the width of the peak in radians
θ is the angle confined between the beam and the plane perpendicular to the reflecting plane.

The FWHM (Full Width at Half Maximum) technique used to estimate the width of the peaks. The results are shown in Table 5.

TABLE 5

Crystallite Size Estimation

| Sample | Formed phases | Crystallite size (nm) |
| --- | --- | --- |
| Calcined zirconia | Baddeleyite ($ZrO_2$) | 35[a] |
| Bulk $WO_3$ | Tungsten Oxide ($WO_3$) | 51[b] |
| $WO_3$(40%)/$ZrO_2$-Impregnation | Baddeleyite ($ZrO_2$) | 58[a] |
|  | Tungsten Oxide ($WO_3$) | 65[b] |
| $WO_3$(40%)/$ZrO_2$—Co-precipitation | Baddeleyite ($ZrO_2$) | 36[a] |
|  | Zirconium Oxide ($ZrO_2$) | 41[c] |
| NiO(20%)—$WO_3$(20%)/$ZrO_2$-Impregnation | Baddeleyite ($ZrO_2$) | 43[a] |
|  | Bunsenite (NiO) | 27[d] |
|  | Nickel Tungsten Oxide ($NiWO_4$) | 54[f] |
| NiO(20%)—$WO_3$(20%)/$ZrO_2$—Co-precipitation | Zirconium Oxide ($ZrO_2$) | 25[c] |
|  | Bunsenite (NiO) | 26[d] |
|  | Nickel Tungsten Oxide ($NiWO_4$) | 57[f] |
| NiO(20%)/$ZrO_2$-Impregnation | Baddeleyite ($ZrO_2$) | 29[a] |
|  | Bunsenite (NiO) | 25[d] |
| NiO(20%)—$WO_3$(5%)/$ZrO_2$-Impregnation | Baddeleyite ($ZrO_2$) | 38[a] |
|  | Bunsenite (NiO) | 26[d] |
|  | Tungsten Oxide ($WO_3$) | 44[e] |
| NiO(20%)—$WO_3$(10%)/$ZrO_2$-Impregnation | Baddeleyite ($ZrO_2$) | 42[a] |
|  | Bunsenite (NiO) | 28[d] |
|  | Tungsten Oxide ($WO_3$) | 44[e] |
|  | Nickel Tungsten Oxide ($NiWO_4$) | 42[f] |
| NiO(20%)—$WO_3$(15%)/$ZrO_2$-Impregnation | Baddeleyite ($ZrO_2$) | 34[a] |
|  | Bunsenite (NiO) | 26[d] |
|  | Tungsten Oxide ($WO_3$) | 32[e] |
|  | Nickel Tungsten Oxide ($NiWO_4$) | 33[f] |
| NiO(20%)—$WO_3$(20%)/$ZrO_2$-Impregnation | Baddeleyite ($ZrO_2$) | 43[a] |
|  | Bunsenite (NiO) | 27[d] |
|  | Nickel Tungsten Oxide ($NiWO_4$) | 54[f] |
| NiO(20%)—$WO_3$(25%)/$ZrO_2$-Impregnation | Baddeleyite ($ZrO_2$) | 47[a] |
|  | Bunsenite (NiO) | 27[d] |
|  | Nickel Tungsten Oxide ($NiWO_4$) | 50[f] |
| NiO(20%)—$WO_3$(30%)/$ZrO_2$-Impregnation | Baddeleyite ($ZrO_2$) | 38[a] |
|  | Bunsenite (NiO) | 24[d] |
|  | Nickel Tungsten Oxide ($NiWO_4$) | 46[f] |
| NiO(20%)—$WO_3$(35%)/$ZrO_2$-Impregnation | Baddeleyite ($ZrO_2$) | 38[a] |
|  | Bunsenite (NiO) | 21[d] |
|  | Nickel Tungsten Oxide ($NiWO_4$) | 41[f] |
| NiO(5%)—$WO_3$(25%)/$ZrO_2$-Impregnation | Baddeleyite ($ZrO_2$) | 45[a] |
|  | Tungsten Oxide ($WO_3$) | 48[e] |
|  | Nickel Tungsten Oxide ($NiWO_4$) | 58[f] |
| NiO(25%)—$WO_3$(25%)/$ZrO_2$-Impregnation | Baddeleyite ($ZrO_2$) | 38[a] |
|  | Bunsenite (NiO) | 25[d] |
|  | Nickel Tungsten Oxide ($NiWO_4$) | 47[f] |
| NiO(60%)—$WO_3$(25%)/$ZrO_2$-Impregnation | Baddeleyite ($ZrO_2$) | 44[a] |
|  | Bunsenite (NiO) | 27[d] |
|  | Nickel Tungsten Oxide ($NiWO_4$) | 51[f] |
| NiO(65%)—$WO_3$(25%)/$ZrO_2$-Impregnation | Bunsenite (NiO) | 29[d] |
|  | Nickel Tungsten Oxide ($NiWO_4$) | 47[f] |
| NiO(70%)—$WO_3$(25%)/$ZrO_2$-Impregnation | Bunsenite (NiO) | 30[d] |
|  | Nickel Tungsten Oxide ($NiWO_4$) | 65[f] |
| NiO(75%)—$WO_3$(25%)-Impregnation | Bunsenite (NiO) | 32[d] |
|  | Nickel Tungsten Oxide ($NiWO_4$) | 47[f] |

[a]Crystallite/phase size estimated using Scherrer's equation on the (−1 1 1) plane of baddeleyite, syn-($ZrO_2$ 37-1484) phase
[b]Crystallite/phase size estimated using Scherrer's equation on the (2 0 2) plane of tungsten oxide-($WO_3$ 43-1035) phase
[c]Crystallite/phase size estimated using Scherrer's equation on the (0 1 1) plane of zirconium oxide-($ZrO_2$ 50-1089) phase
[d]Crystallite/phase size estimated using Scherrer's equation on the (2 0 0) plane of bunsenite, syn-(NiO 47-1049) phase
[e]Crystallite/phase size estimated using Scherrer's equation on the (1 1 0) plane of tungsten oxide-($WO_3$ 41-0905) phase
[f]Crystallite/phase size estimated using Scherrer's equation on the (−1 1 1) plane of nickel tungsten oxide-($NiWO_4$ 15-0755) phase.

The sizes of the crystallites (nm) of the oxygen carrier catalysts are listed in Table 5. The uncertainty involved in the estimation of the FWHM from MDI Jade 6 is less than 10% for all samples. For the tungsten oxide phase, the crystallite size is smaller in the supported samples than in the bulk metal oxide samples. Generally, the impregnated samples formed by impregnation have higher crystallite/phase sizes than the samples formed by co-precipitation, except for the $NiWO_4$ phase (54 nm impregnated and 57 co-precipitated) which falls within the margin of error. The crystal size for the tungsten oxide phase is about 44 nm for both Ni(20%)-$WO_3$(5%)-$ZrO_2$-Impregnation and Ni(20%)-$WO_3$(10%)-$ZrO_2$-Impregnation samples. With further loading of $WO_3$ (i.e. Ni(20%)-$WO_3$(15%)-$ZrO_2$-Impregnation), the crystallite size is reduced to 32 nm before the disappearance of the phase with Ni(20%)-$WO_3$(20%)-$ZrO_2$-Impregnation sample and samples loaded with more $WO_3$. For the oxygen carriers with constant $WO_3$ loading of 25%, and different nickel oxide loading, the crystallite size of the nickel tungsten oxide phase was between 47-58 nm, while the size for the bunsenite phase was between 25-32 nm. It was also observed that as the NiO loading increases, the crystallite size of this phase also increases.

EQUIVALENTS AND SCOPE

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art.

It will be understood by those skilled in the art that various changes in form and details may be made to the embodiments described therein without departing from the scope of the invention encompassed by the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context.

It is also noted that the term "comprising" is intended to be open and permits but does not require the inclusion of additional elements or steps. When the term "comprising" is used herein, the term "consisting of" is thus also encompassed and disclosed. Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. Where the term "about" is used, it is understood to reflect +/−10% of the recited value. In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein.

REFERENCES (1) Fan, L-S et al. Energy Environ. Sci., 2012, 5, 7254-7280.
(2) Fang, H. et al. Int. J. Chem. Eng., 2009 Article ID 710515, 1-16, doi:10.1155/2009/710515.
(3) Kodama, T. et al., Energy 2000, 25, 411-425.
(4) Charisiou, N. D. et al., Front. Envir. Sci. 2017, 5, Article 66, 1-13, doi.org/10.3389/fenvs.2017.00066.
(5) Chinese Patent Publication No. CN106902837A
(6) Chen, S. et a., ACS Catal., 2017, 5, 3548-3559.
(7) Southmayd D. W. et al., J. Chem. Soc. Faraday Trans. 1993, 89, 2075-2083.
(8) Sohn, J. R. & Lee, S. Y. Appl. Catal. A: General, 1997, 164, 127-140.
(9) Torres, G. C. et al., Quim. Nova, 2012, 35, 748-754.
(10) Cho, P. et al., Ind. Eng. Chem. Res. 2005, 44, 668-676.
(11) Shimizu, T. et al., Solar Energy 2001, 71, 315-324.
(12) Kodama T. et al., Energy, 2003, 28, 1055-1068.
(13) Kwak, J. H. Int. J. Hydrogen Energy, 2013, 38, 8293-8305.
(14) Quddus, M. R. A Novel Mixed Metallic Oxygen Carrier for Chemical Looping Combustion: Preparation, Characterization and Kinetic Modeling (Thesis), 2013, University of Western Ontario.
(15) Tijani, M. M. et al., *Energy*, 2017, 138, 873-882.

The invention claimed is:

1. A catalyst composition for use in a chemical looping combustion reaction, the catalyst composition comprising a mixture of metal oxides dispersed on a ceramic support, the mixture of metal oxides including NiO and $WO_3$, wherein the metal oxides of NiO and $WO_3$, as components of the catalyst composition, interact with each other on the ceramic support to form a nickel tungsten oxide ($NiWO_4$) interaction complex which functions as an oxygen carrier in the chemical looping combustion reaction, wherein the catalyst composition comprising 35% to 60% (w/w) NiO and 10% to 35% (w/w) of $WO_3$.

2. The catalyst composition of claim 1, wherein the ceramic support is calcium aluminate of formula $CaAl_2O_4$, silica of formula $SiO_2$, titanium dioxide of formula $TiO_2$, perovskite of formula $CaTiO_3$, alumina of formula $Al_2O_3$, yttrium dioxide of formula $Y_2O_3$, barium zirconate of formula $BaZrO_3$, magnesium aluminate of formula $MgAl_2O_4$, magnesium silicate of formula $MgSi_2O_4$, lanthanum oxide of formula $La_2O_3$ or zirconia of formula $ZrO_2$.

3. The catalyst composition of claim 1, wherein the ceramic support is zirconia of formula $ZrO_2$.

4. The catalyst composition of claim 3, wherein the zirconia is calcined at a temperature at or above 900° C. for at least about 4 hours.

5. The catalyst composition of claim 3, comprising between 5% to about 65% $ZrO_2$ (w/w).

6. The catalyst composition of claim 1, having an oxygen carrying capacity of 8.9% (w/w) to about 15.6% (w/w).

7. The catalyst composition of claim 1, having a Brunauer-Emmett-Teller (BET) surface area between 10.3 $m^2/g$ to about 16.7 $m^2/g$.

8. The catalyst composition of claim 1, having a pore volume of 0.069 cm$^3$/g to about 0.094 cm$^3$/g.

9. The catalyst composition of claim 1, having an adsorption average pore width (4V/A by BET) between 217 Å to about 264 Å.

10. A process for synthesizing the catalyst composition according to claim 1, the process comprising: mixing nickel (II) nitrate hexahydrate (N$_2$NiO$_6$.6H$_2$O) with ammonium metatungstate ((NH$_4$)$_6$(H$_2$W$_{12}$O$_{40}$)) and the ceramic support in water and evaporating the water, wherein the nickel (II) nitrate hexahydrate is provided in an amount sufficient to provide the catalyst with between 35% to 60% (w/w) NiO and wherein the ammonium metatungstate is provided in an amount sufficient to provide the catalyst with between 10% to about 35% (w/w) WO$_3$.

11. The process of claim 10, wherein the ceramic support is calcium aluminate of formula CaAl$_2$O$_4$, silica of formula SiO$_2$, titanium dioxide of formula TiO$_2$, perovskite of formula CaTiO$_3$, alumina of formula Al$_2$O$_3$, yttrium dioxide of formula Y$_2$O$_3$, barium zirconate of formula BaZrO$_3$, magnesium aluminate of formula MgAl$_2$O$_4$, magnesium silicate of formula MgSi$_2$O$_4$, lanthanum oxide of formula La$_2$O$_3$ or zirconia of formula ZrO$_2$.

12. The process of claim 10, wherein the ceramic support is zirconia of formula ZrO$_2$.

13. The process of claim 12, wherein the zirconia is calcined at a temperature at or above 900° C. for at least 4 hours.

14. The process of claim 12, wherein the synthesized catalyst includes between 5% to 65% ZrO$_2$ (w/w).

15. The process of claim 10, wherein the synthesized catalyst has an oxygen carrying capacity of 8.9% (w/w) to 15.6% (w/w).

16. The process of claim 10, wherein the synthesized catalyst has a Brunauer-Emmett-Teller (BET) surface area between 10.3 m$^2$/g to 16.7 m$^2$/g.

17. The process of claim 10, wherein the synthesized catalyst has a pore volume of 0.069 cm$^3$/g to 0.094 cm$^3$/g.

18. The process of claim 10, wherein the synthesized catalyst has an adsorption average pore width (4V/A by BET) between 217 Å to 264 Å.

\* \* \* \* \*